US008341461B2

(12) United States Patent
Otani et al.

(10) Patent No.: US 8,341,461 B2
(45) Date of Patent: Dec. 25, 2012

(54) IMAGE FORMING APPARATUS

(75) Inventors: Atsushi Otani, Moriya (JP); Shigeo Hata, Toride (JP); Akihiko Sakai, Abiko (JP); Shoji Takeda, Tokyo (JP); Satoru Yamamoto, Abiko (JP); Keita Takahashi, Abiko (JP); Hirotaka Seki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 212 days.

(21) Appl. No.: 12/731,218

(22) Filed: Mar. 25, 2010

(65) Prior Publication Data

US 2010/0268989 A1 Oct. 21, 2010

(30) Foreign Application Priority Data

Apr. 16, 2009 (JP) ................................ 2009-100371

(51) Int. Cl.
*G06F 11/00* (2006.01)

(52) U.S. Cl. .............................. 714/10; 358/1.14; 710/1

(58) Field of Classification Search ..................... 714/10
See application file for complete search history.

(56) References Cited

U.S. PATENT DOCUMENTS

| | | | | |
|---|---|---|---|---|
| 4,860,111 | A | 8/1989 | Shimizu et al. | |
| 7,006,249 | B2 | 2/2006 | Matsuda | |
| 7,046,938 | B2 | 5/2006 | Yamamoto et al. | |
| 7,164,873 | B2 | 1/2007 | Yamamoto et al. | |
| 7,167,256 | B1 | 1/2007 | Koike et al. | |
| 7,171,573 | B2 * | 1/2007 | Scheele | 713/375 |
| 7,609,404 | B2 | 10/2009 | Nakahashi | |
| 2005/0055469 | A1 * | 3/2005 | Scheele | 710/1 |
| 2005/0254090 | A1 | 11/2005 | Kammerlocher et al. | |
| 2006/0066901 | A1 * | 3/2006 | Sugita | 358/1.15 |
| 2007/0086037 | A1 | 4/2007 | Kitahara et al. | |
| 2007/0103702 | A1 | 5/2007 | Yamamoto et al. | |
| 2007/0260753 | A1 * | 11/2007 | Komatsu et al. | 710/1 |

FOREIGN PATENT DOCUMENTS

| | | | |
|---|---|---|---|
| JP | 2002301997 | A | 10/2002 |
| JP | 2006191338 | A | 7/2006 |
| JP | 2006256275 | A | 9/2006 |

* cited by examiner

*Primary Examiner* — Kamini Patel
(74) *Attorney, Agent, or Firm* — Fitzpatrick, Cella, Harper & Scinto

(57) ABSTRACT

There is provided an image forming apparatus which adopts a distributed control system and increases the error detection accuracy of each control unit. To accomplish this, the image forming apparatus includes a master control unit that controls the overall image forming apparatus, a plurality of sub-master control units that control a plurality of functions for performing image formation, and a plurality of slave control units that control loads for implementing a plurality of functions. The master control unit determines a diagnosis path for performing a diagnosis process for an error using the signal lines and a connection bridge connected to the respective control units. The master control unit performs the diagnosis process for an error in accordance with the determined diagnosis path.

6 Claims, 17 Drawing Sheets

IMAGE FORMING APPARATUS

BACKGROUND OF THE INVENTION

1. Field of the Invention

The present invention relates to an image forming apparatus implemented by a distributed control system including a plurality of CPU groups having a hierarchical structure.

2. Description of the Related Art

Centralized control using one CPU is performed for printer device control of an image forming apparatus using an electrophotographic system. An increasing CPU load due to centralized control requires a higher performance CPU. In addition, as the load of the printer device rises, a bundle of control communication lines needs to be laid from a CPU board to distant load driver units and many long control communication lines are indispensable. To solve these problems, a control form is receiving a great deal of attention, in which control modules which build an electrophotographic system are assigned to sub-CPUs.

Examples of the construction of a control system by distributing respective partial module control functions to a plurality of CPUs have been proposed in several control equipment product fields other than copying machines. For example, a distributed control system is applied to the system of a vehicle and the like. However, in the distributed control system, an error needs to be detected strictly to normally operate a plurality of boards (CPUs) in collaboration with each other, unlike centralized control.

For example, Japanese Patent Laid-Open No. 2006-191338 has proposed a gateway apparatus which monitors periodic messages periodically transmitted through a plurality of buses and detects a trouble device from the communication status of the periodic messages. Japanese Patent Laid-Open No. 2002-301997 has proposed a technique of easily specifying the trouble factor of an automobile by sending pseudo control information from a trouble diagnosis apparatus.

However, these conventional techniques suffer the following problems. In the distributed control system in which a plurality of CPUs perform collaborative control, it is important to individually check the operations of the CPUs which perform collaborative control, and specify a trouble part upon generation of an error. A trouble node can be confirmed by arranging a device which intensively monitors troubles. However, a monitoring-dedicated node is required and raises the cost. In a system having a hierarchical structure, it is difficult to specify a concrete trouble part when a trouble is determined using only the traffic of an upper layer.

It is effective to detect a trouble part in the test mode. However, when the test mode is applied to an image forming apparatus, the contents of the test are limited upon generation of a paper jam by a trouble during operation. Further, it is difficult to detect a trouble part in the test mode upon generation of a dynamic timing error or in an emergency stop process during operation.

SUMMARY OF THE INVENTION

The present invention enables realization of an image forming apparatus which adopts a distributed control system and increases the error detection accuracy of each control unit.

One aspect of the present invention provides an image forming apparatus comprising: a master control unit that controls the image forming apparatus for forming an image on a printing material; a sub-master control unit that is controlled by the master control unit via a first signal line and controls a function for performing image formation; a slave control unit that is controlled by the sub-master control unit via a second signal line and controls a load for implementing the function; and a connection bridge that is connected between the master control unit and the slave control unit, wherein the master control unit performs a diagnosis process for an error of the image forming apparatus using at least one of the first signal line, the second signal line, and the connection bridge.

Another aspect of the present invention provides an image forming apparatus comprising: a master control unit that controls the image forming apparatus for forming an image on a printing material; a first sub-master control unit that is controlled by the master control unit via a first signal line and controls a function for performing image formation; a first slave control unit that is controlled by the first sub-master control unit via a second signal line and controls a load for implementing the function; a second sub-master control unit that is controlled by the master control unit via the first signal line and controls a function for performing image formation; a second slave control unit that is controlled by the second sub-master control unit via a third signal line and controls a load for implementing the function; and a connection bridge that is connected between the first slave control unit and the second slave control unit, wherein the master control unit performs a diagnosis process for an error of the image forming apparatus using at least one of the first signal line, the second signal line, the third signal line, and the connection bridge.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Arrangement of Image Forming Apparatus>

Figure 1:
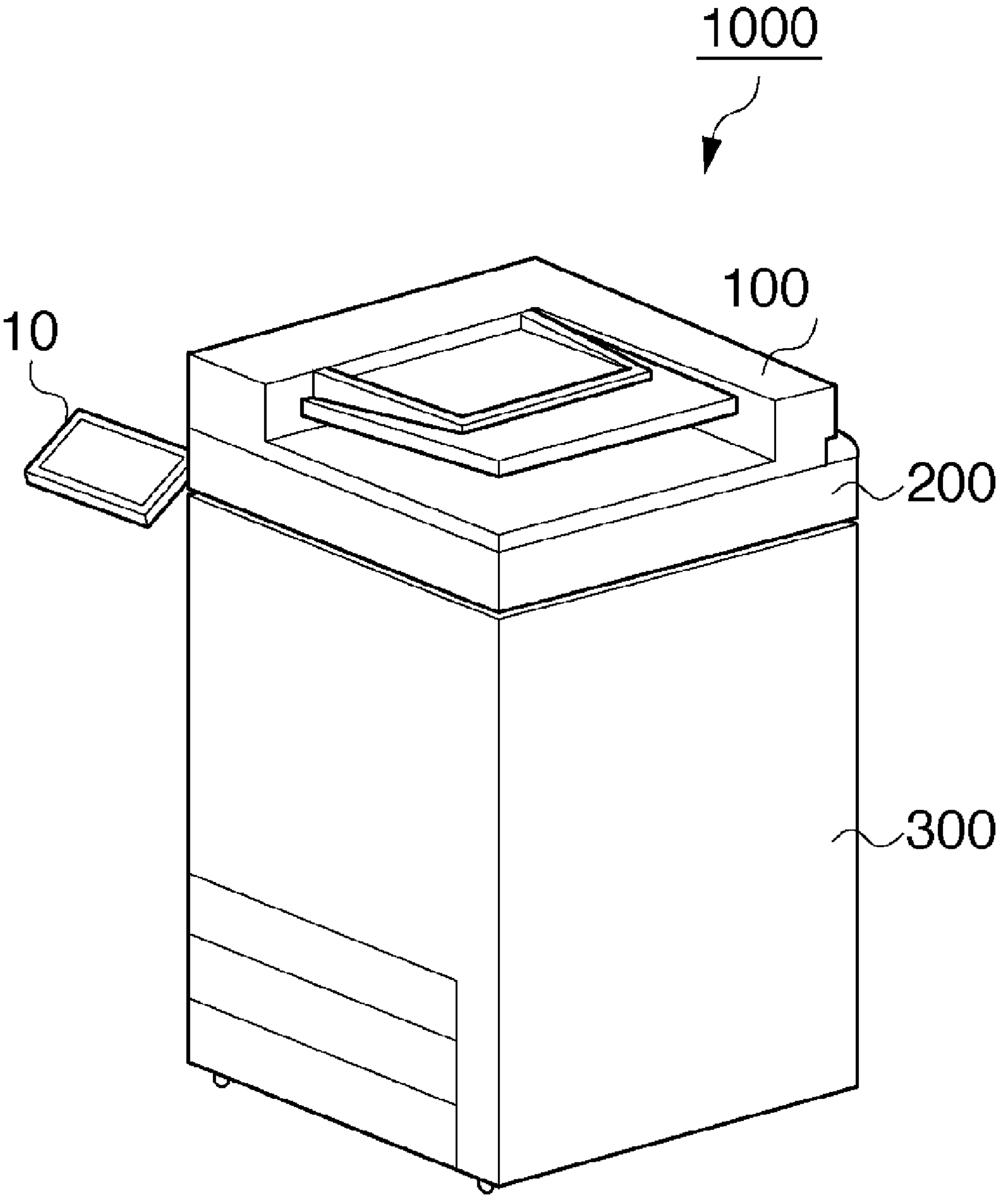
FIG. 1 is a perspective view showing an overview of an image forming apparatus 1000 according to the first embodiment.

The first embodiment will be described below with reference to FIGS. 1 to 13. FIG. 1 is a perspective view showing an overview of an image forming apparatus 1000 according to the first embodiment.

The image forming apparatus 1000 includes an automatic document feeder (DF) 100, image reading unit 200, image forming unit 300, and operation unit 10. As shown in FIG. 1, the image reading unit 200 is mounted on the image forming unit 300. The automatic document feeder 100 is mounted on the image reading unit 200. The image forming apparatus 1000 implements distributed control using a plurality of control units (CPUs). The arrangement of each CPU will be described later with reference to FIG. 3.

The automatic document feeder 100 automatically conveys a document onto a document glass. The image reading unit 200 outputs image data by reading the document conveyed from the automatic document feeder 100. The image forming unit 300 forms an image on a printing material based on image data output from the automatic document feeder 100 or image data input from an external apparatus connected via a network. The operation unit 10 includes a GUI (Graphical User Interface) which allows the user to perform various kinds of operations. The operation unit 10 includes a display unit such as a touch panel and can present information to the user.

<Image Forming Unit>

Figure 2:
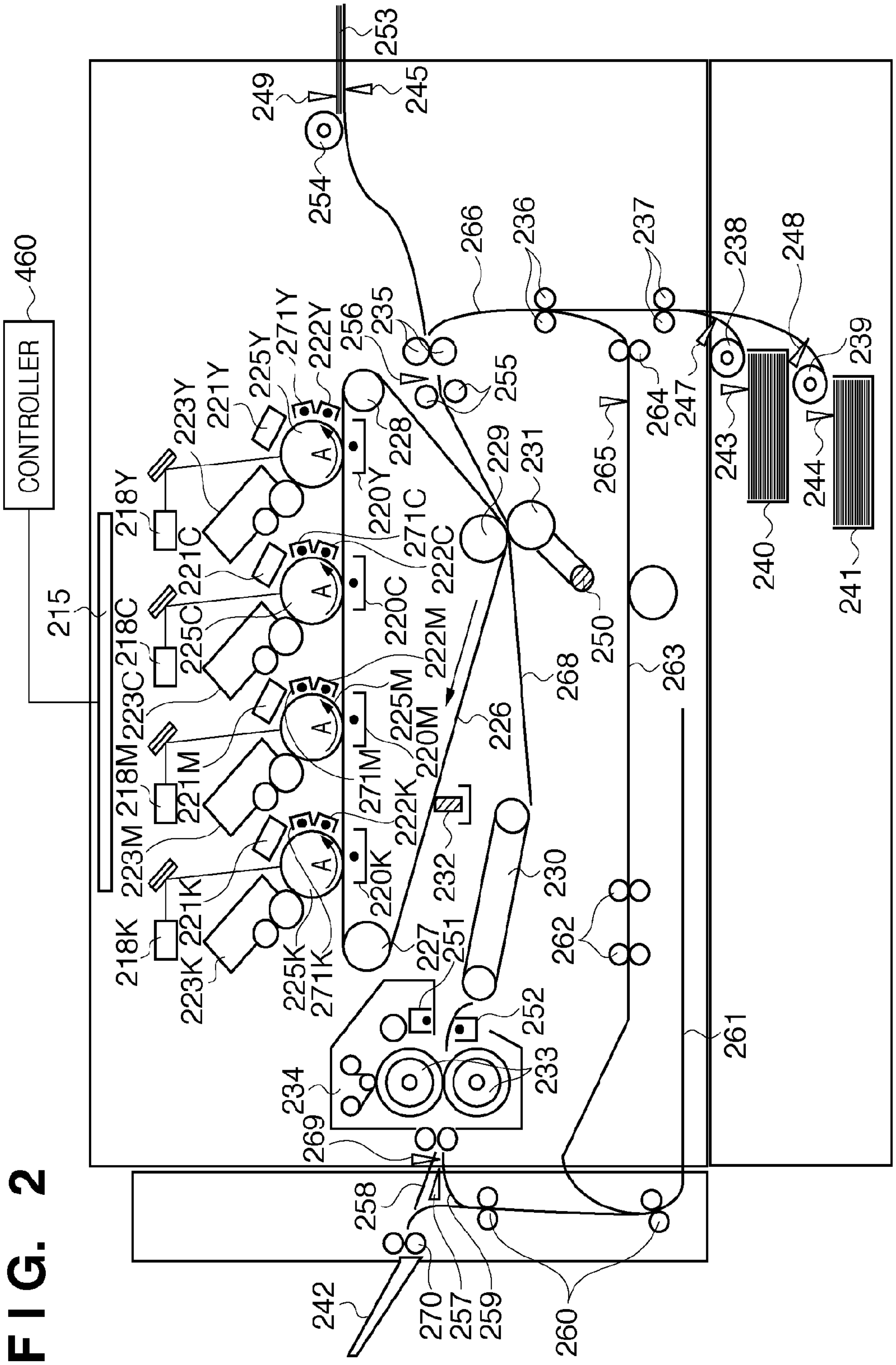
FIG. 2 is a sectional view showing an example of the arrangement of an image forming unit 300 according to the first embodiment.

The image forming unit 300 will be described in detail with reference to FIG. 2. FIG. 2 is a sectional view showing an example of the arrangement of the image forming unit 300 according to the first embodiment. The image forming unit 300 according to the embodiment employs an electrophotographic system. Note that letters Y, M, C, and K as the suffices of reference numerals in FIG. 2 indicate respective engines corresponding to yellow, magenta, cyan, and black toners. In the following description, an engine corresponding to all types of toner will be denoted by a reference numeral without any of the letters Y, M, C, and K as suffixes. Individual engines will be denoted by reference numerals with the letters Y, M, C, and K as suffixes.

A photosensitive drum (to be simply referred to as a "photosensitive member") 225 serving as an image carrier for forming a full-color electrostatic image is provided to be rotated by a motor in the direction indicated by arrow A. The photosensitive member 225 is surrounded by a primary charger 221, exposure unit 218, developing unit 223, transfer unit 220, cleaner unit 222, and charge remover 271.

A developing unit 223K is used for monochromatic development, and develops a latent image on a photosensitive member 225K with K toner. Developing units 223Y, 223M, and 223C are used for full-color development, and develop latent images on photosensitive members 225Y, 225M, and 225C with Y, M, and C toners, respectively. The transfer unit 220 transfers toner images developed in the respective colors on the photosensitive members 225 at once onto a transfer belt 226 serving as an intermediate transfer member. As a result, the toner images of the four colors are superimposed.

The transfer belt 226 is spanned around rollers 227, 228, and 229. The roller 227 functions as a driving roller which is coupled to a driving source to drive the transfer belt 226. The roller 228 functions as a tension roller to adjust the tension of the transfer belt 226. The roller 229 functions as a backup roller of a transfer roller serving as a secondary transfer unit 231. A transfer roller drive unit 250 is a driving unit for bringing the secondary transfer unit 231 into contact with or apart from the transfer belt 226. A cleaner blade 232 is arranged below the transfer belt 226 after the position where the belt passes through the secondary transfer unit 231. The blade scrapes off residual toner from the transfer belt 226.

A registration roller 255, a feed roller pair 235, and vertical path roller pairs 236 and 237 feed printing materials (printing sheets) stored in paper cassettes 240 and 241 and a manual paper feed unit 253 to a nip portion which is a contact portion between the secondary transfer unit 231 and the transfer belt 226. At this time, the transfer roller drive unit 250 brings the secondary transfer unit 231 into contact with the transfer belt 226. A toner image formed on the transfer belt 226 is transferred onto a printing material at the nip portion. Thereafter, a fixing unit 234 thermally fixes the toner image transferred on the printing material. The printing material is then delivered outside the apparatus.

The paper cassettes 240 and 241 and the manual paper feed unit 253 respectively include sheet absence sensors 243, 244, and 245 each for detecting the presence/absence of a printing material. Also, the paper cassettes 240 and 241 and the manual paper feed unit 253 respectively include feed sensors 247, 248, and 249 each for detecting a printing material pickup failure.

An image forming operation by the image forming unit 300 will be described below. After the start of image formation, pickup rollers 238, 239, and 254 convey printing materials stored in the paper cassettes 240 and 241 and the manual paper feed unit 253 one by one to the feed roller pair 235. When the feed roller pair 235 conveys the printing material to the registration roller 255, a registration sensor 256 located immediately before the registration roller 255 detects the passage of the printing material.

When the registration sensor 256 detects the passage of the printing material, the apparatus according to the embodiment temporarily interrupts the conveying operation after the lapse of a predetermined period of time. As a consequence, the printing material comes into contact with the registration roller 255 at rest, and the conveying operation stops. At this time, the convey position is so fixed as to make the leading end of the printing material perpendicular to the conveying path, thereby correcting a skew of the printing material, i.e., the state in which the conveying direction of the printing material shifts from the conveying path. This processing will be called position correction. The position correction is required to minimize any subsequent inclination of the image forming direction relative to the printing material. After the position correction, the registration roller 255 is activated to supply the printing material to the secondary transfer unit 231. The registration roller 255 is coupled to a driving source and driven to rotate upon receiving a driving force via a clutch.

The surface of the photosensitive member 225 is then negatively charged uniformly to a predetermined charge potential by applying a voltage to the primary charger 221. The exposure unit 218 including a laser scanner unit exposes an image portion on the charged photosensitive member 225 to set the image portion at a predetermined exposure potential, thereby forming a latent image. The exposure unit 218 forms a latent image corresponding to an image by turning on and off laser light based on image data sent from a controller 460 via a printer control I/F 215.

A developing bias set in advance for each color is applied to the developing roller of the developing unit 223. The latent image is developed with toner and visualized as a toner image when passing through the developing roller position. The transfer unit 220 transfers the toner image onto the transfer belt 226. The secondary transfer unit 231 then transfers the image onto the printing material conveyed by the feed unit. The printing material passes through a post-registration conveying path 268, and is conveyed to the fixing unit 234 via a fixing convey belt 230.

In the fixing unit 234, first of all, pre-fixing chargers 251 and 252 charge the printing material to prevent image disturbance by compensating for the attraction power of toner, and fixing rollers 233 thermally fix the toner image. After that, a delivery flapper 257 switches the conveying path to a delivery path 258, and delivery rollers 270 deliver the printing material onto a delivery tray 242. The cleaner unit 222 removes and recovers residual toner from the photosensitive member 225. Finally, the charge remover 271 uniformly removes charges from the photosensitive member 225 to near 0 V in preparation for the next image formation cycle.

The color image formation start timing of the image forming apparatus 1000 allows to form an image at an arbitrary position on the transfer belt 226 because of simultaneous transfer of Y, M, C, and K toner images. However, it is necessary to determine the image formation start timing while shifting the timing to cancel misregistration of the transfer positions of toner images on the photosensitive members 225Y, 225M, and 225C.

In the image forming unit 300, printing materials can be successively fed from the paper cassettes 240 and 241 and the manual paper feed unit 253. In this case, printing materials are fed from the paper cassettes 240 and 241 and the manual paper feed unit 253 at the shortest intervals by taking account of the sheet length of a preceding printing material so that printing materials do not overlap each other. As described above, the registration roller 255 is activated after position correction and supplies a printing material to the secondary transfer unit 231. When the printing material reaches the secondary transfer unit 231, the registration roller 255 is temporarily stopped again in order to correct the position of a succeeding printing material in the same manner as the preceding printing material.

An operation to form an image on the reverse surface of a printing material will be described in detail. When forming an image on the reverse surface of a printing material, an image is first formed on the obverse surface of the printing material. When an image is formed on only the obverse surface, the fixing unit 234 thermally fixes the toner image, and then the printing material is directly delivered to the delivery tray 242. When an image is to be formed on the reverse surface successively, the delivery flapper 257 switches the conveying path to a reverse surface path 259 upon detecting the printing material by a sensor 269. In synchronism with this, reverse rollers 260 are driven to rotate and convey the printing material to an obverse/reverse surface inversion path 261. After the printing material passes through the obverse/reverse surface inversion path 261 by a distance corresponding to the width in the feed direction, the reverse rollers 260 are driven to rotate reversely and switch the traveling direction of the printing material. With the image-bearing obverse surface facing down, obverse/reverse surface path convey rollers 262 are driven to convey the printing material to an obverse/reverse surface path 263.

The printing material is conveyed to re-feed rollers 264 along the obverse/reverse surface path 263, and a re-feed sensor 265 located immediately before the re-feed rollers 264 detects the passage of the printing material. When the re-feed sensor 265 detects the passage of the printing material, the apparatus according to the embodiment temporarily interrupts the conveying operation after the lapse of a predetermined period of time. Consequently, the printing material comes into contact with the re-feed rollers 264 at rest, and the conveying operation temporarily stops. At this time, the position of the printing material is so fixed as to make the leading end of the printing material perpendicular to the conveying path, thereby correcting a skew of the printing material, i.e., the state in which the conveying direction of the printing material shifts from the conveying path in the re-feed path. This processing will be called position recorrection.

The position recorrection is necessary to minimize any subsequent inclination of the image forming direction relative to the reverse surface of the printing material. After the position recorrection, the re-feed rollers 264 are activated to convey the printing material along a feed path 266 with the obverse and reverse surfaces being inverted. A subsequent image forming operation is the same as the above-described one for the obverse surface, so a description thereof will not be repeated. The delivery flapper 257 switches the conveying path to the delivery path 258. Then, the printing material bearing images on its obverse and reverse surfaces is delivered to the delivery tray 242.

Note that the image forming unit 300 can successively feed printing materials in the two-sided printing mode as well. However, this apparatus includes only one system for forming an image on a printing material, fixing a formed toner image, and the like. It is therefore impossible to simultaneously print on the obverse and reverse surfaces. In the two-sided printing mode, the image forming unit 300 alternately forms images on printing materials fed from the paper cassettes 240 and 241 and the manual paper feed unit 253 and printing materials which are inverted for reverse-surface printing and re-fed to the image forming unit.

In the image forming unit 300, the loads shown in FIG. 2 are grouped into four control blocks to be described later, namely a convey module A 280, convey module B 281, image forming module 282, and fixing module 283, each of which is autonomously controlled. The image forming unit 300 also includes a master module 284 for comprehensively controlling the four control blocks to make them function as an image forming apparatus. The control arrangement of each module will be explained with reference to FIG. 3.

Figure 3:
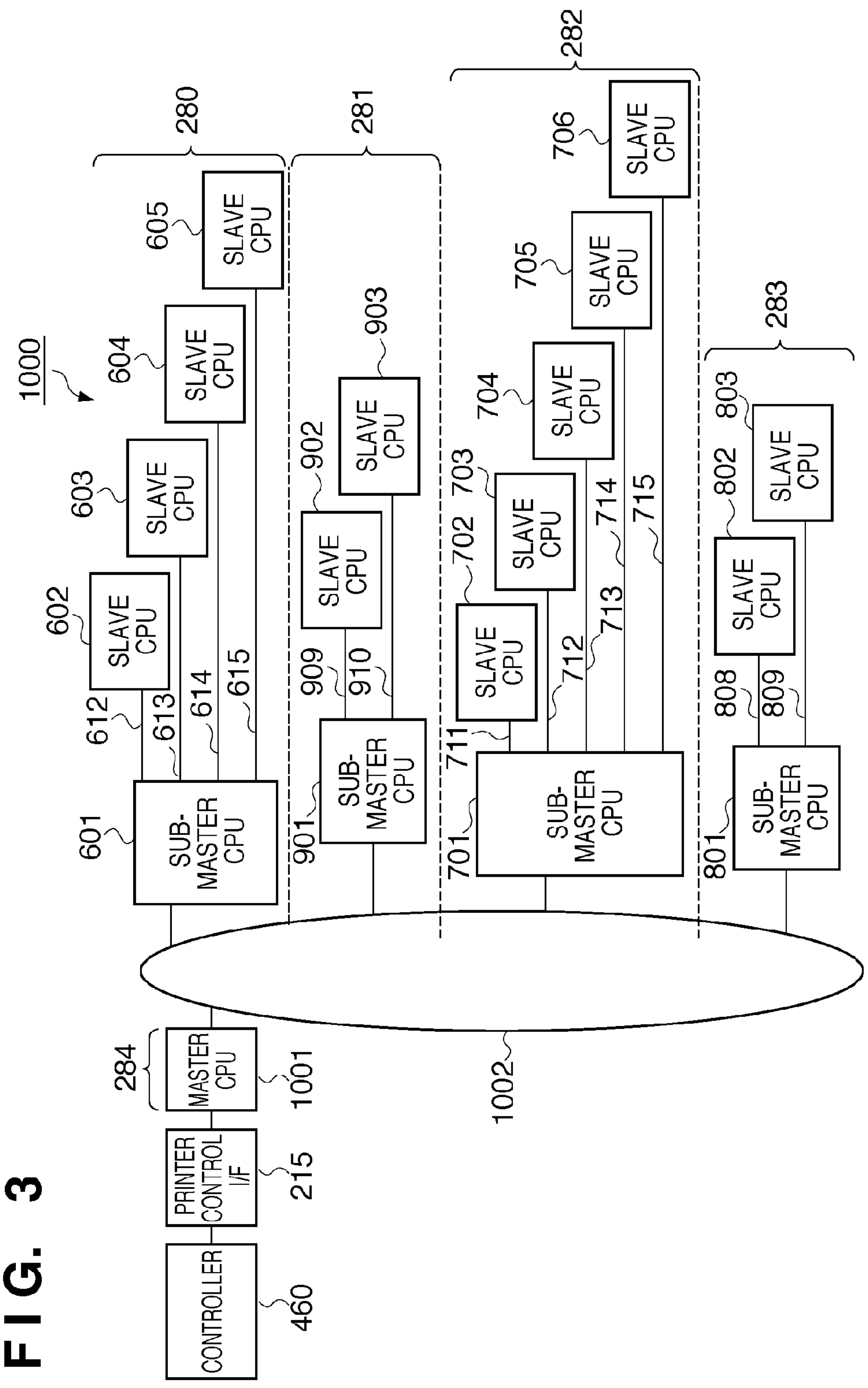
FIG. 3 is a block diagram schematically showing the connection between a master CPU, sub-master CPUs, and slave CPUs according to the first embodiment.

FIG. 3 is a block diagram schematically showing the connection between a master CPU, sub-master CPUs, and slave CPUs according to the first embodiment. In the embodiment, a master CPU (master control unit/first layer control unit) 1001 provided in the master module 284 controls the overall image forming apparatus 1000 based on instructions and image data sent from the controller 460 via the printer control I/F 215. The convey module A 280, convey module B 281, image forming module 282, and fixing module 283 for executing image formation respectively include sub-master CPUs (sub-master control units/second layer control units) 601, 901, 701, and 801 for controlling the respective functions. The master CPU 1001 controls the sub-master CPUs 601, 901, 701, and 801. The respective functional modules include slave CPUs (slave control units/third layer control units) 602, 603, 604, 605, 902, 903, 702, 703, 704, 705, 706, 802, and 803 for operating the loads to execute the respective functions. The sub-master CPU 601 controls the slave CPUs 602, 603, 604, and 605. The sub-master CPU 901 controls the slave CPUs 902 and 903. The sub-master CPU 701 controls the slave CPUs 702, 703, 704, 705, and 706. The sub-master CPU 801 controls the slave CPUs 802 and 803.

As shown in FIG. 3, the master CPU 1001 and the sub-master CPUs 601, 701, 801, and 901 are connected to each other via a common network communication bus (first signal line) 1002. The sub-master CPUs 601, 701, 801, and 901 are also connected to each other via the network communication bus (first signal line) 1002. Note that the master CPU 1001 and the sub-master CPUs 601, 701, 801, and 901 may be ring-connected to each other. The sub-master CPU 601 is further connected one-to-one (peer-to-peer connection) to the slave CPUs 602, 603, 604, and 605 via high-speed serial communication buses (second signal lines) 612, 613, 614, and 615. Likewise, the sub-master CPU 701 is connected to the slave CPUs 702, 703, 704, 705, and 706 via high-speed serial communication buses (second signal lines) 711, 712, 713, 714, and 715. The sub-master CPU 801 is connected to the slave CPUs 802 and 803 via high-speed serial communication buses (second signal lines) 808 and 809. The sub-master CPU 901 is connected to the slave CPUs 902 and 903 via high-speed serial communication buses (second signal lines) 909 and 910. In this case, the high-speed serial communication bus is used for short-distance, high-speed communication.

In the image forming apparatus 1000 according to the embodiment, functions are divided to implement control requiring timing-dependent responsiveness within functional modules comprehensively controlled by the respective sub-master CPUs. Thus, high-speed serial communication buses with good responsiveness are used for communication between the slave CPUs for driving end loads and the sub-master CPUs. In other words, signal lines higher in data transfer timing accuracy than the first signal lines are used as the second signal lines.

On the other hand, only the rough process sequence of the image forming operation requiring no precise control timing is controlled between the sub-master CPUs 601, 701, 801, and 901 and the master CPU 1001. For example, the master CPU 1001 instructs the sub-master CPUs to start a pre-image formation process, pre-feed process, and post-image formation process. Before the start of image formation, the master CPU 1001 issues instructions to the sub-master CPUs, based on modes (e.g., monochrome mode and two-sided image formation mode) designated by the controller 460. Also, only operations requiring no precise timing control are executed between the sub-master CPUs 601, 701, 801, and 901. That is, the control of the image forming apparatus is divided into control units which do not mutually require precise timing control. The respective sub-master CPUs control the respective control units at precise timings. The image forming apparatus 1000, therefore, minimizes the communication traffic and enables connection using the inexpensive, low-speed network communication bus 1002. Note that the master CPU, sub-master CPUs, and slave CPUs need not always be mounted on uniform control boards, and can be variably located in accordance with situations concerning apparatus implementation.

Figure 4:
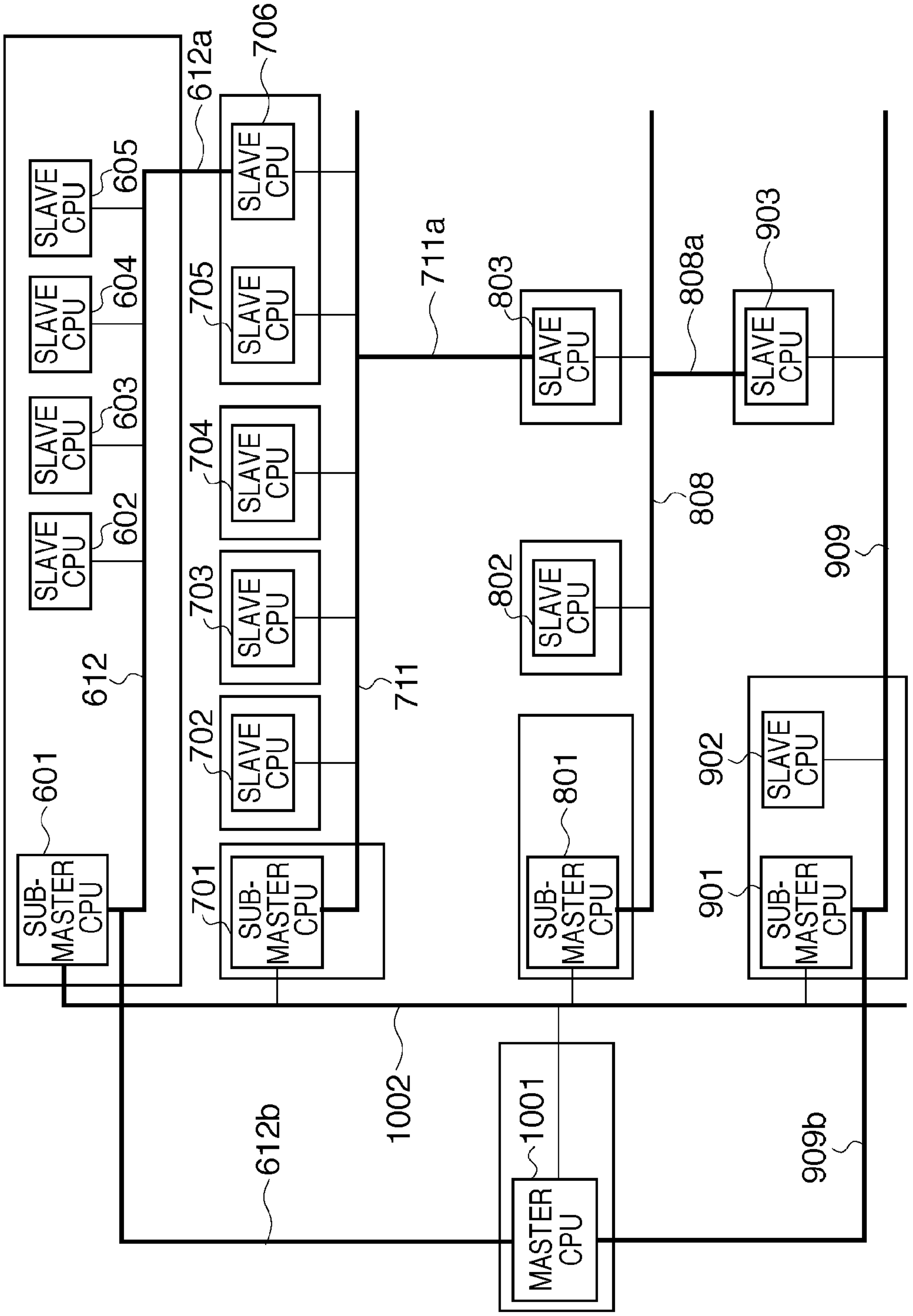
FIG. 4 is a view showing an example of the control boards of the image forming apparatus 1000 according to the first embodiment.

The specific locations of the master CPU, sub-master CPUs, and slave CPUs on boards in this embodiment will be described with reference to FIG. 4 in terms of board arrangement. FIG. 4 is a view showing an example of the control boards of the image forming apparatus 1000 according to the first embodiment.

The embodiment can employ various control board arrangements, as shown in FIG. 4. For example, the sub-master CPU 601 and the slave CPUs 602, 603, 604, and 605 are mounted on a single board. A sub-master CPU and slave CPUs may be mounted on independent boards, like the sub-master CPU 701 and the slave CPUs 702, 703, and 704 or the sub-master CPU 801 and the slave CPUs 802 and 803. Some slave CPUs may be mounted on a single board, like the slave CPUs 705 and 706. Moreover, only some sub-master CPUs and some slave CPUs may be mounted on a single board, like the sub-master CPU 901 and the slave CPU 902.

As shown in FIG. 4, the serial bus between the sub-master CPU and the slave CPUs for each sub-module is connected to a connection bridge (connection line) which connects sub-modules. This connection is used to perform a diagnosis process upon generation of an error. A connection line 612*b* connects the master CPU 1001 and the control serial bus 612 of the sub-master CPU 601. A connection line 612*a* connects the control serial bus 612 of the sub-master CPU 601 and the slave CPU 706. A connection line 711*a* connects the control serial bus 711 of the sub-master CPU 701 and the slave CPU 803. A connection line 808*a* connects the control serial bus 808 of the sub-master CPU 801 and the slave CPU 903. A connection line 909*b* connects the master CPU 1001 and the control serial bus 909 of the sub-master CPU 901.

The serial buses 612, 711, 808, and 909 comply with an interface form which permits a plurality of bus masters. The slave CPU 706 runs as a master on the serial bus 612. Similarly, the slave CPU 803, slave CPU 903, and master CPU 1001 run as masters on the serial bus 711, the serial bus 909, and the serial buses 612 and 909, respectively.

<Slave CPU>

Figure 5:
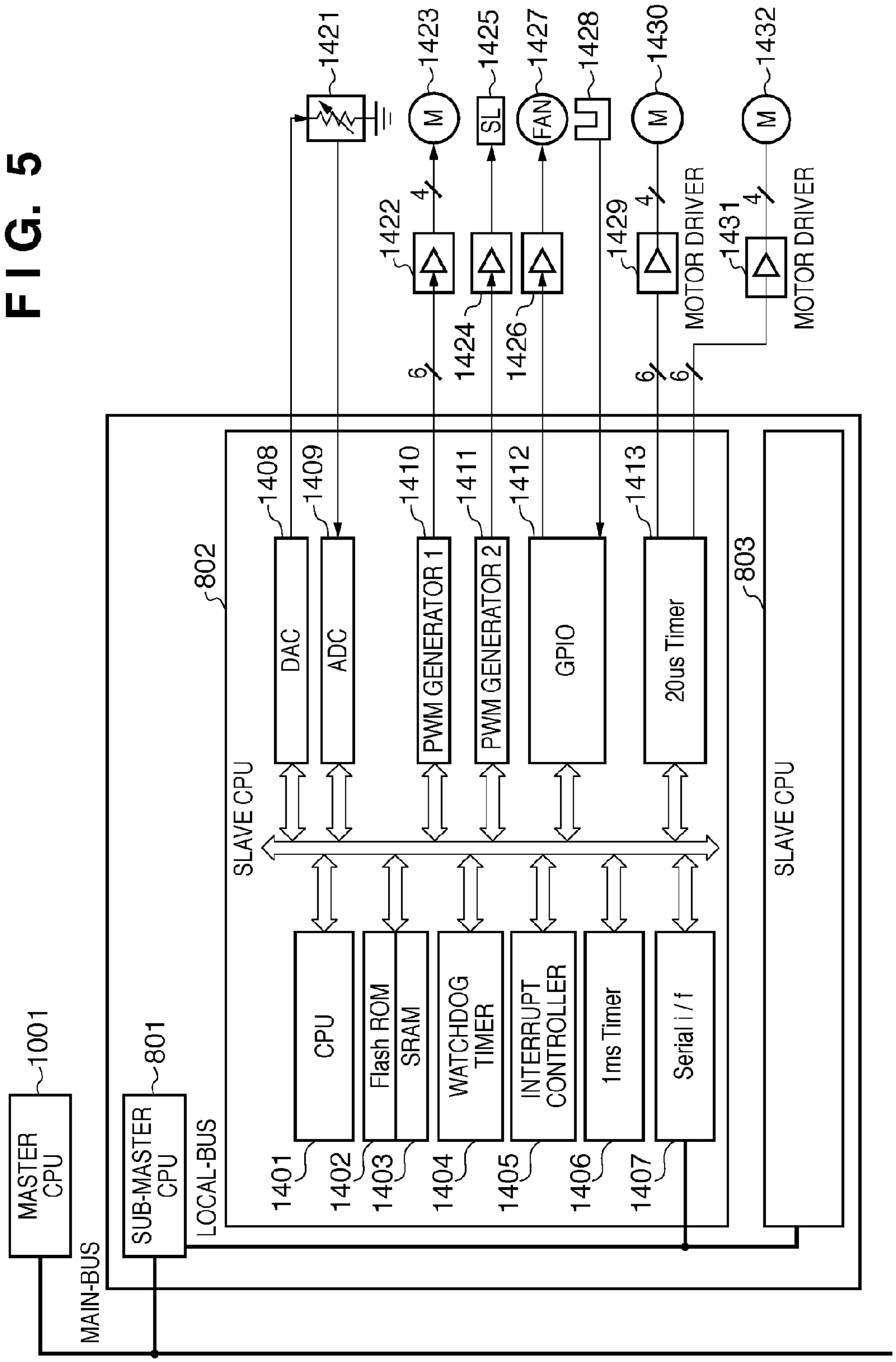
FIG. 5 is a view showing an example of the arrangement of a slave CPU 802 and the device connection according to the first embodiment.

Control by the slave CPU will be explained with reference to FIGS. 5 to 8. FIG. 5 is a view showing an example of the arrangement of the slave CPU 802 and the device connection according to the first embodiment. FIG. 5 shows in detail the master CPU 1001, sub-master CPU 801, and slave CPUs 802 and 803 in FIG. 3. FIG. 5 also shows the internal structure of the slave CPU 802, the device connection, and the configuration model of the sub-master CPU 801 and slave CPU 802. The slave CPU 802 controls devices as shown in FIG. 5. However, this arrangement example merely explains control contents and does not reflect an actual device arrangement.

The slave CPU 802 includes a CPU 1401, a flash memory 1402, an SRAM (Static Random Access Memory) 1403, a watchdog timer 1404, an interrupt controller 1405, general-purpose timers 1406 and 1413, a serial I/F 1407, a D/A converter 1408, an A/D converter 1409, PWM (Pulse Width Modulation) generators 1410 and 1411, and a GPIO (General Purpose I/O) 1412.

The CPU 1401 connects various devices using a peripheral circuit in accordance with a program. The flash memory 1402 holds data and programs to be performed by the CPU 1401. The SRAM 1403 is a work memory for the CPU 1401.

The watchdog timer 1404 monitors the operating state of the CPU 1401. The interrupt controller 1405 prompts the CPU 1401 to interrupt a process upon a change of the internal state such as serial communication and a change of a signal from an external I/O. The interrupt controller 1405 accepts an interrupt factor for switching the process, and performs a process corresponding to the status change. The general-purpose timer 1406 is used for an interrupt of a 1-ms period. The general-purpose timer 1413 generates a high-speed periodic interrupt for generating a motor driving signal. In this example, the general-purpose timer 1413 generates an interrupt of a 20-μs period.

The serial I/F 1407 is used for serial communication between the sub-master CPU 801 and the slave CPU 803. The D/A converter 1408 converts a digital signal into an analog signal and has a plurality of channels. The A/D converter 1409 converts an analog signal into a digital signal and has a plurality of channels.

The PWM generators 1410 and 1411 generate PWM signals using general-purpose timers. The GPIO 1412 has a plurality of general-purpose input/output ports.

Loads connected to the slave CPU 802 will be described. An analog sensor 1421 outputs a detection value as an analog value. A motor driver 1422 updates the excitation pattern of a motor in accordance with an input clock frequency and drives stepping motors. Stepping motors 1423, 1430, and 1432 include a plurality of coils and rotate in accordance with the pattern of a current flowing through the coils. A solenoid driver 1424 converts an input voltage into a current and drives a solenoid. A solenoid 1425 generates a magnetic field in accordance with a current flowing through the coil and attracts an internal actuator. A fan driver 1426 converts an input voltage into a current and drives a fan. A fan 1427 is used to cool the apparatus. A photointerrupter 1428 is made up of an LED (Light Emitting Diode) and phototransistor, and changes the output in accordance with light incident on the phototransistor. Motor drivers 1429 and 1431 update the motor excitation pattern in response to input of a plurality of phase excitation pattern signals.

In FIG. 5, a control signal to the motor driver is input to the 20-μs general-purpose timer 1413. However, this only represents that firmware stored in the flash memory 1402 generates a timing signal using an interrupt from the general-purpose timer 1413 which is set to generate a timing signal to the motor driver 1422 in a 20-μs period. In practice, the control signal to the motor driver is input to the port of the GPIO 1412.

<Stepping Motor Control>

Figure 6:
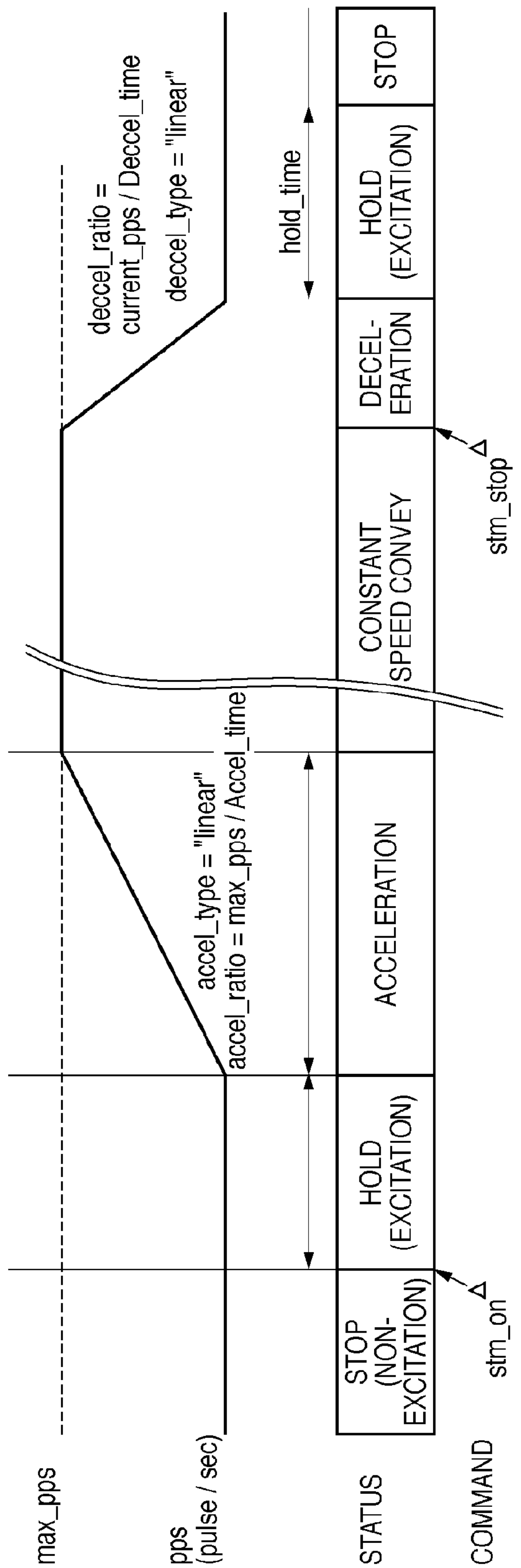
FIG. 6 is a chart for explaining control of a stepping motor by a CPU 1401 according to the first embodiment.

The process contents of the CPU 1401 will be described. Stepping motor control will be explained first with reference to FIG. 6. FIG. 6 is a chart for explaining control of the stepping motor by the CPU 1401 according to the first embodiment.

The CPU 1401 of the slave CPU 802 updates a driving signal to the motor driver 1422 in the period of the general-purpose timer 1413. While exchanging control information with the sub-master CPU 801 via the serial I/F 1407, the CPU 1401 controls acceleration/deceleration of the stepping motors 1423, 1430, and 1432 by controlling the driving signal to the motor driver 1422.

stm_on and stm_stop commands shown in FIG. 6 are instruction commands from the sub-master CPU 801 to the slave CPU 802. Upon receiving the stm_on command while the motor is at rest, the CPU 1401 performs initial hold and accelerates the motor, executing constant-speed conveyance. If the stm_stop command is input during the constant-speed conveyance, the CPU 1401 decelerates the motor and stops excitation after a hold process.

<Solenoid Driving>

Figure 7:
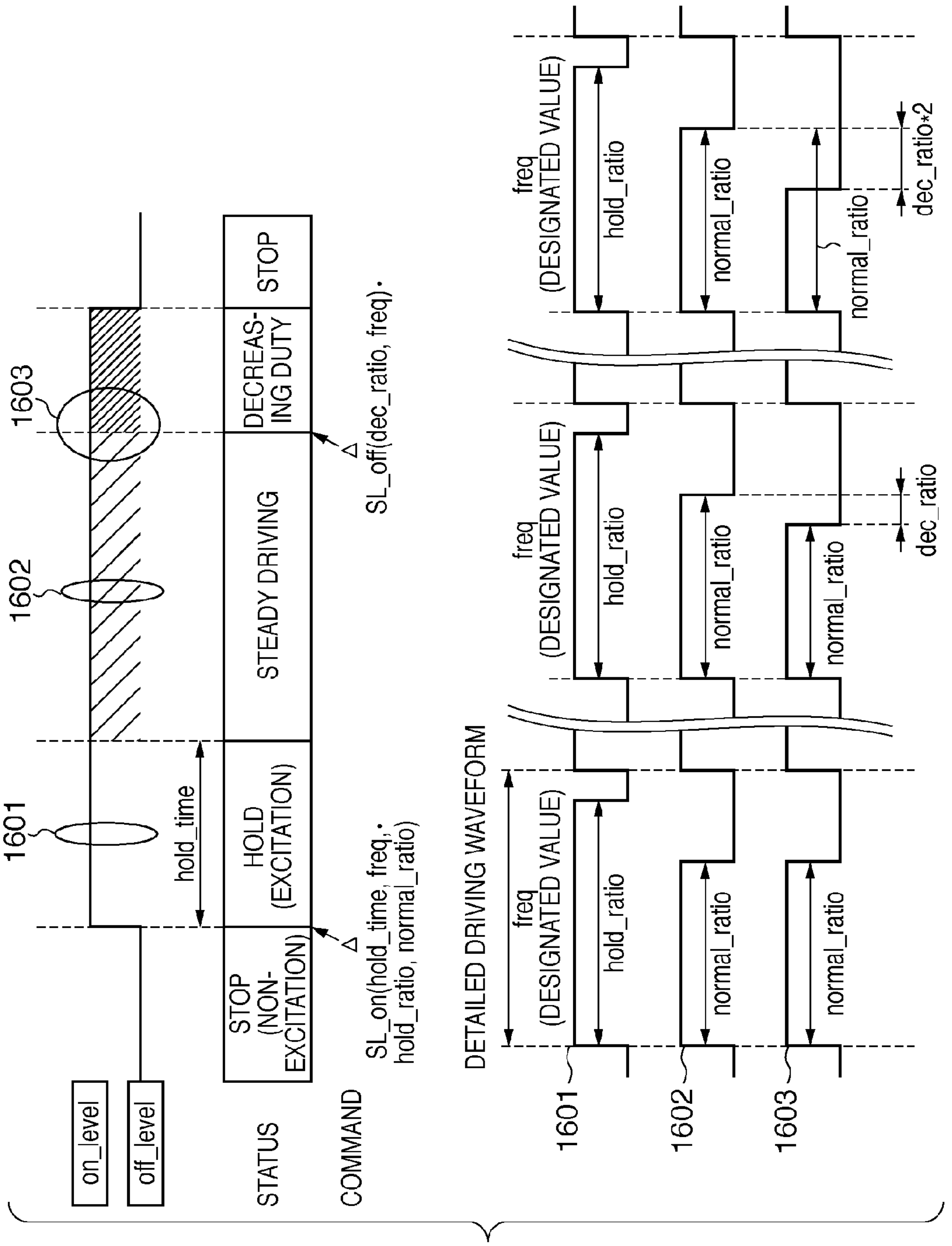
FIG. 7 is a chart for explaining driving of a solenoid by the CPU 1401 according to the first embodiment.

Solenoid driving will be described with reference to FIG. 7. FIG. 7 is a chart for explaining driving of the solenoid by the CPU 1401 according to the first embodiment. SL_on and SL_off commands shown in FIG. 7 are instruction commands from the sub-master CPU 801 to the slave CPU 802.

Upon receiving the SL_on command, the CPU 1401 performs PWM driving at a hold duty 1601. After the lapse of the hold time, the CPU 1401 continues driving at a steady driving duty 1602. If the SL_off command is input, the CPU 1401 controls to stop excitation while gradually decreasing the ON duty as indicated by reference numeral 1603. In this case, the ON duty is updated in a 1-ms period.

Figure 8:
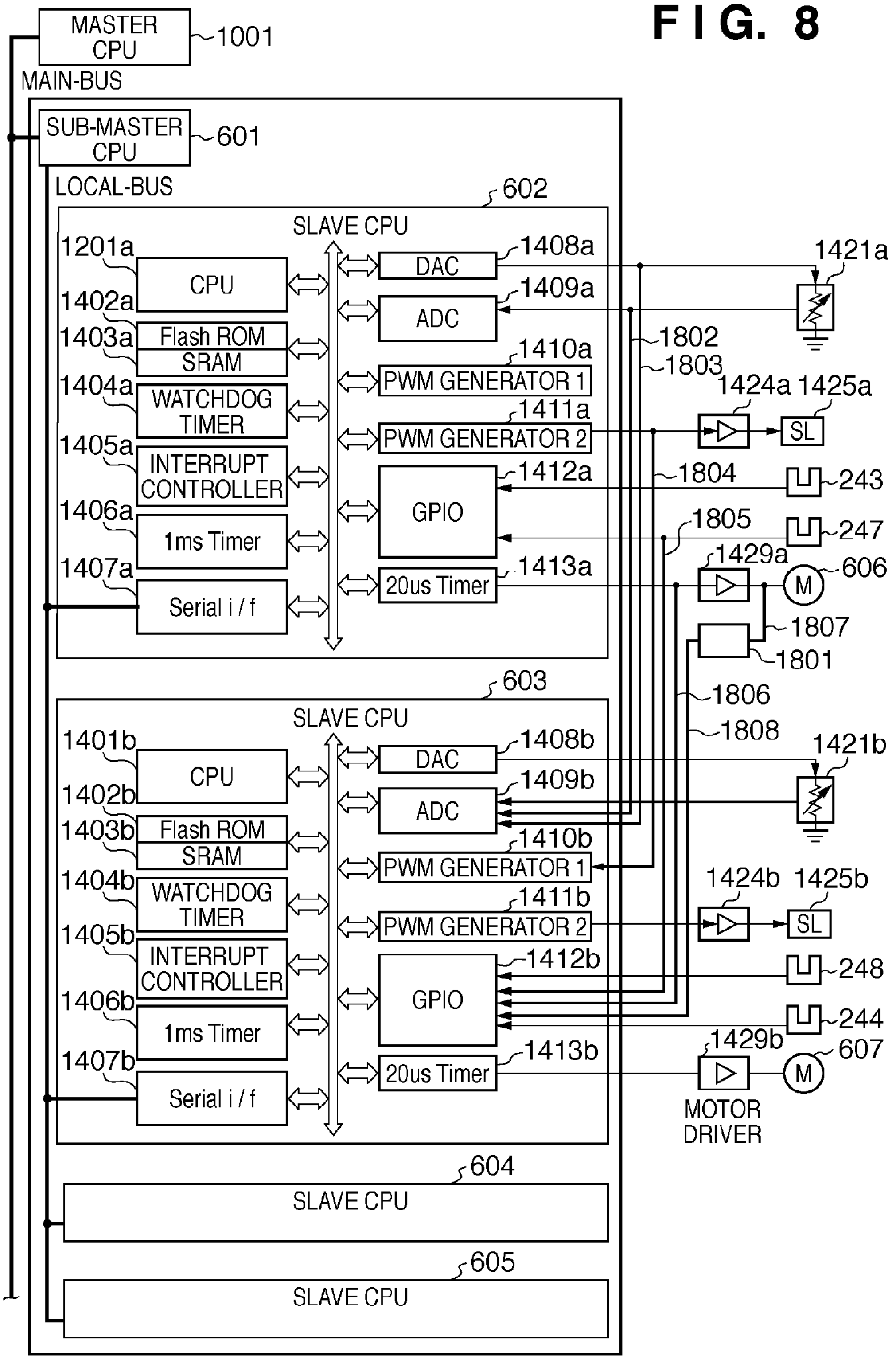
FIG. 8 is a view showing an example of the arrangements of slave CPUs 602 and 603 and the device connection according to the first embodiment.

FIG. 8 is a view showing an example of the arrangements of the slave CPUs 602 and 603 and the device connection according to the first embodiment. FIG. 8 shows in detail the master CPU 1001, sub-master CPU 601, and slave CPUs 602 to 605. FIG. 8 also shows the internal structures of the slave CPUs 602 and 603 and the device connection. A suffix "a" is added to the reference numerals of the internal components of the slave CPU 602 and devices connected to the slave CPU 602. A suffix "b" is added to the reference numerals of the internal components of the slave CPU 603 and devices connected to the slave CPU 603.

The slave CPU 602 has, as control loads, a driving source motor 606 for driving the pickup roller 238 associated with the cassette 240, the sheet absence sensor 243, and the feed sensor 247. The slave CPU 602 performs control until a printing material is conveyed to the feed path 266. The slave CPU 603 has, as control loads, a driving source motor 607 for driving the pickup roller 239 associated with the cassette 241, the sheet absence sensor 244, and the feed sensor 248. The slave CPU 603 performs control until a printing material is conveyed to the feed path 266.

Some of connection lines (signal lines) between the slave CPU 602 and control devices are connected to the slave CPU 603 to check the operation of the slave CPU 602 by the slave CPU 603. For the sake of simplicity, the connection diagram for check shows a connection which allows the slave CPU 603 to monitor the connection portions between the slave CPU 602 and devices. In practice, however, the slave CPUs 602 and 603 can confirm the mutual operations by connecting them so that the slave CPU 602 can monitor the connection portions between the slave CPU 603 and devices. The connection portions will be explained. Note that the arrangement of the slave CPU is the same as that described with reference to FIG. 5, and a description thereof will not be repeated.

A connection line 1802 allows even the A/D converter 1409*b* to monitor an output from the analog sensor 1421*a*. A connection line 1803 allows even the A/D converter 1409*b* to monitor a reference voltage output from the D/A converter 1408*a* to the analog sensor 1421*a*. A connection line 1804 is used to supply a PWM waveform from the PWM generator 1411*a* to the PWM generator 1410*b*. A connection line 1805 is used to input a status signal from the feed sensor 247 to the GPIO 1412*b*. A connection line 1806 allows the GPIO 1412*b* to monitor a control input to the motor driver 1429*a*. A connection line 1807 is used to monitor an output from the motor driver 1429*a* and is connected to the GPIO 1412*b* via a voltage converter 1801 and connection line 1808.

The slave CPUs 602 and 603 control processes to pick up printing sheets from different paper cassettes and covey them. Hence, these two slave CPUs 602 and 603 basically operate exclusively.

<Operation Check Control>

Figure 9A:
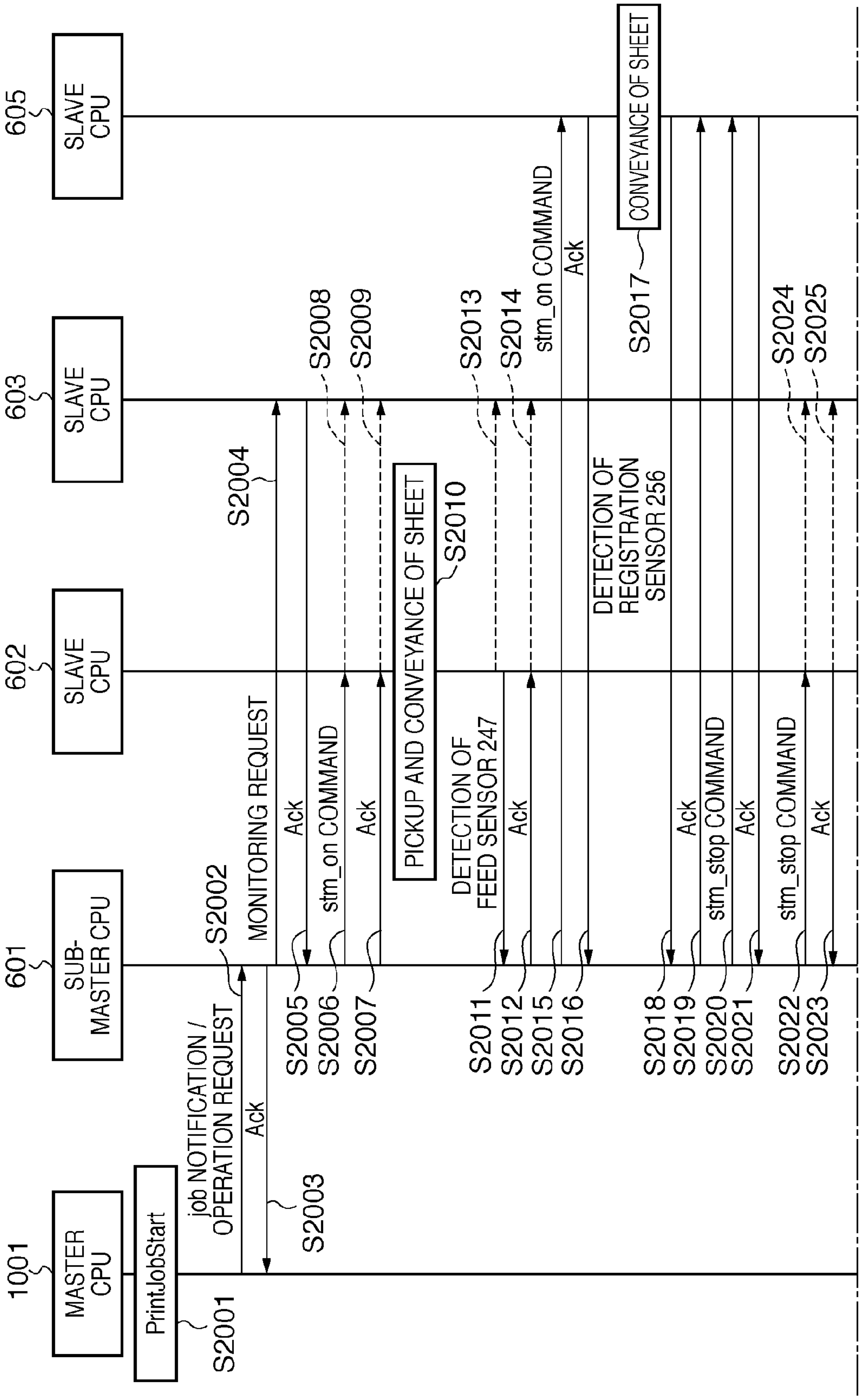
FIGS. 9A and 9B are sequence charts in respective control units in an operation check according to the first embodiment.
Figure 9B:
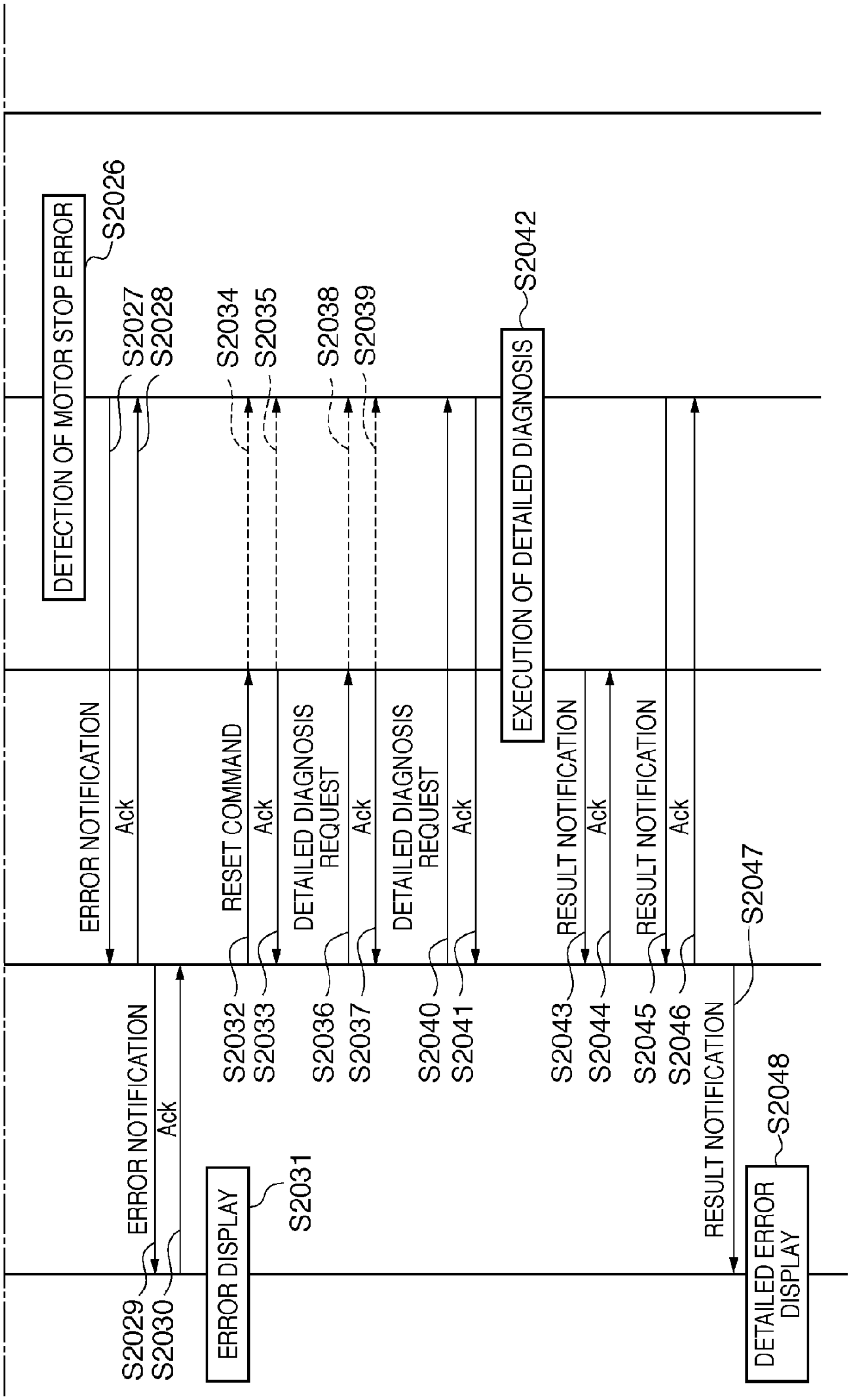

Operation check control in the embodiment will be explained with reference to FIGS. 9A and 9B. In the operation check control, a given control unit monitors the operation of another control unit and detects an error. According to the embodiment, a control unit which monitors the operation of another active control unit is an inactive control unit. For this purpose, each control unit includes a monitoring unit which monitors the operation of another control unit and makes an error diagnosis. FIGS. 9A and 9B are sequence charts in respective control units in an operation check according to the first embodiment. Processes by the master CPU 1001, sub-master CPU 601, and slave CPUs 602, 603, and 605 when performing a print job will be described.

In step S2001, the master CPU 1001 starts a print job upon accepting the start of the print job from a user. In step S2002, the master CPU 1001 outputs a job notification and operation request to the sub-master CPU 601. In step S2003, the sub-master CPU 601 sends back an acknowledgement (Ack) to the master CPU 1001. In step S2004, the sub-master CPU 601 requests the slave CPU 603 to monitor the operation of the slave CPU 602. Since the print job is premised on that paper feed is controlled via the slave CPU 602, the sub-master CPU 601 issues a monitoring request to the slave CPU 603. In step S2005, the slave CPU 603 sends back an Ack to the monitoring request to the sub-master CPU 601.

In step S2006, the sub-master CPU 601 sends a request (stm_on command) to the slave CPU 602 to drive the motor and pick up and convey a sheet. In step S2007, the slave CPU 602 sends back an Ack to the sub-master CPU 601. In steps S2008 and S2009, the slave CPU 603 monitors communication between the sub-master CPU 601 and the slave CPU 602. In FIGS. 9A and 9B, the monitoring operation of the slave CPU 603 is indicated by dotted arrows, like steps S2008 and S2009.

In step S2010, the slave CPU 602 drives the motor 607 to pick up and convey a sheet. After the sheet is conveyed and a level change (sheet detection state: rise) of the feed sensor 247 is detected, the slave CPU 602 notifies the sub-master CPU 601 of the status change of the feed sensor 247 in step S2011. In step S2012, the sub-master CPU 601 sends back an Ack to the slave CPU 602. In steps S2013 and S2014, the slave CPU 603 monitors commands exchanged between the sub-master CPU 601 and the slave CPU 602.

Upon receiving the notification of the level change of the feed sensor 247, the sub-master CPU 601 notifies the slave CPU 605 of the driving start (stm_on command) of motors 609 to 611 in step S2015. In step S2016, the slave CPU 605 sends back an Ack to the sub-master CPU 601. In step S2017, the slave CPU 605 starts driving the motors. If a change of the registration sensor 256 is detected (sheet detection state: rise), the slave CPU 605 notifies the sub-master CPU 601 of the status change of the registration sensor 256 in step S2018. In step S2019, the sub-master CPU 601 sends back an Ack to the slave CPU 605.

In steps S2020 and S2022, the sub-master CPU 601 notifies the slave CPU 605 to stop driving the motors 609 to 611 and the slave CPU 602 to stop driving the motor 607 (stm_stop command). In steps S2021 and S2023, the slave CPUs 605 and 602 send back an Ack to the sub-master CPU 601, respectively. In steps S2024 and S2025, the slave CPU 603 monitors commands exchanged between the sub-master CPU 601 and the slave CPU 602.

In step S2026, the slave CPU 603 detects that the slave CPU 602 keeps driving the motor 607 though it has received the stop instruction. Thus, in step S2027, the slave CPU 603 notifies the sub-master CPU 601 of an error. In step S2028, the sub-master CPU 601 sends back an Ack to the slave CPU 603.

Upon receiving the error notification, in step S2029, the sub-master CPU 601 notifies the master CPU 1001 that an error has been detected. In step S2030, the master CPU 1001 sends back an Ack to the sub-master CPU 601. In step S2031, the master CPU 1001 controls the operation unit 10 to display information indicating that the error has been detected.

In step S2032, the sub-master CPU 601 issues a hardware or command reset request to the slave CPU 602 for an emergency stop of the motor, thereby prompting the emergency stop of the motor and forcibly turning off the motor power supply. In step S2033, the slave CPU 602 sends back an Ack to the sub-master CPU 601. In steps S2034 and S2035, the slave CPU 603 monitors commands exchanged between the sub-master CPU 601 and the slave CPU 602.

In steps S2036 and S2040, the sub-master CPU 601 notifies a detailed diagnosis request to the slave CPUs 602 and 603. In steps S2037 and S2041, the slave CPUs 602 and 603 send back an Ack to the sub-master CPU 601, respectively. In step S2042, the slave CPUs 602 and 603 make a detailed diagnosis in collaboration with each other. In this detailed diagnosis, for example, error contents and an error part are specified.

In steps S2043 and S2045, the slave CPUs 602 and 603 notify the sub-master CPU 601 of error information containing the error contents and error part as the determination results. In steps S2044 and S2046, the sub-master CPU 601 sends back an Ack to the slave CPUs 602 and 603, respectively. In step S2047, the sub-master CPU 601 specifically determines a trouble part by collating the notification results of the respective slave CPUs, and notifies the master CPU 1001 of the determination result. In step S2048, the master CPU 1001 notifies the user of detailed error contents (e.g., displays them on the display unit) upon receiving the result, and helps him to easily correct the error.

In the embodiment, a slave CPU outside a sub-module or the master CPU 1001 monitors the operation of the sub-module by using the connection lines 612*b*, 612*a*, 711*a*, 808*a*, and 909*b* shown in FIG. 4. For example, the slave CPU 705 is connected to the control serial bus 612 of the sub-master CPU 601 via the connection line 612*a*. The slave CPU 705 takes charge of control concerning Y color and becomes idle in the monochrome mode. In the monochrome mode, therefore, the slave CPU 705 can monitor the operating states of the sub-master CPU 601 and slave CPUs 602 to 605 by monitoring communication through the serial bus.

<Detailed Diagnosis Process>

Figure 10A:
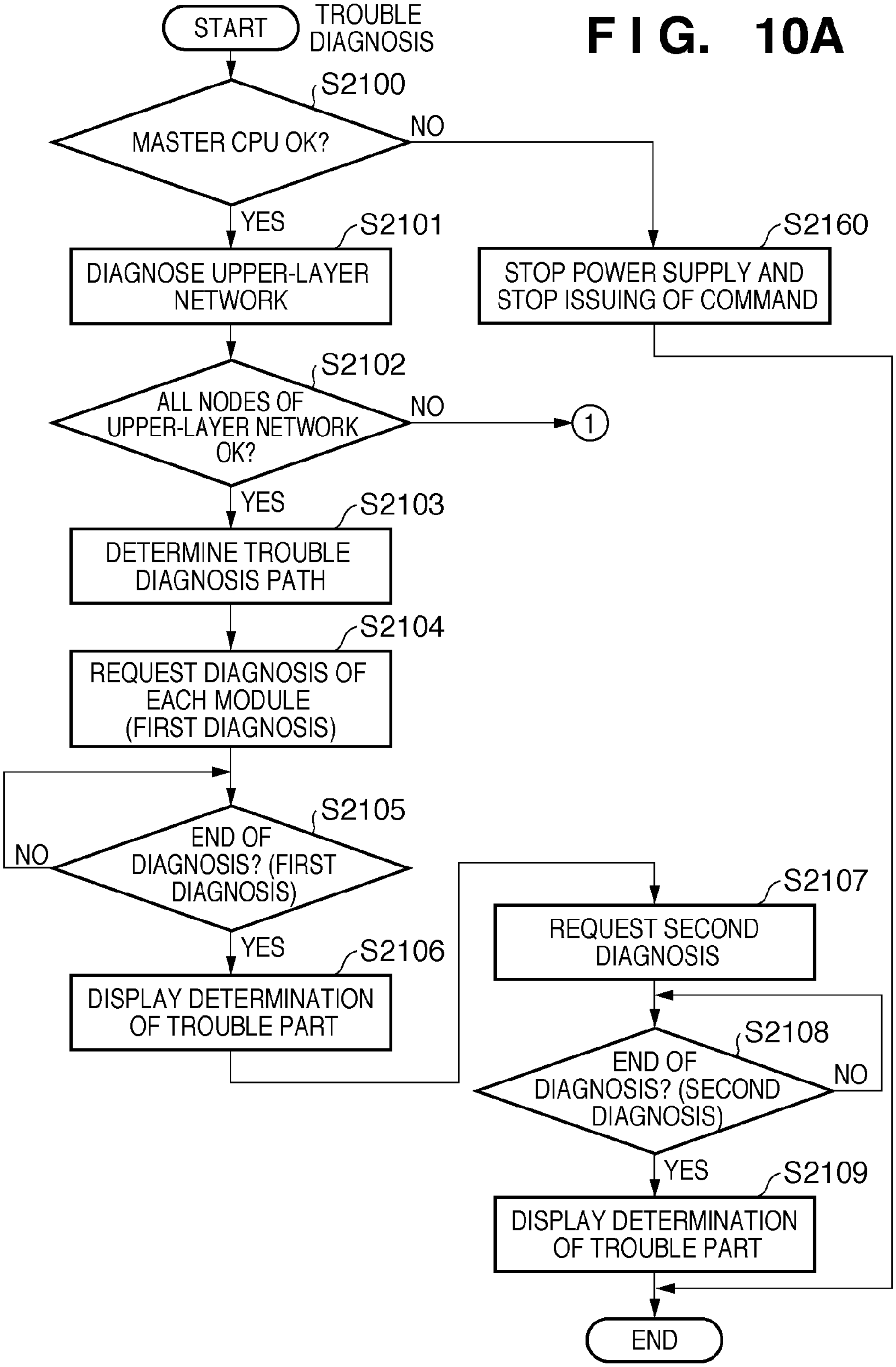
FIGS. 10A and 10B are flowcharts showing the sequence of a detailed diagnosis process according to the first embodiment.
Figure 10B:
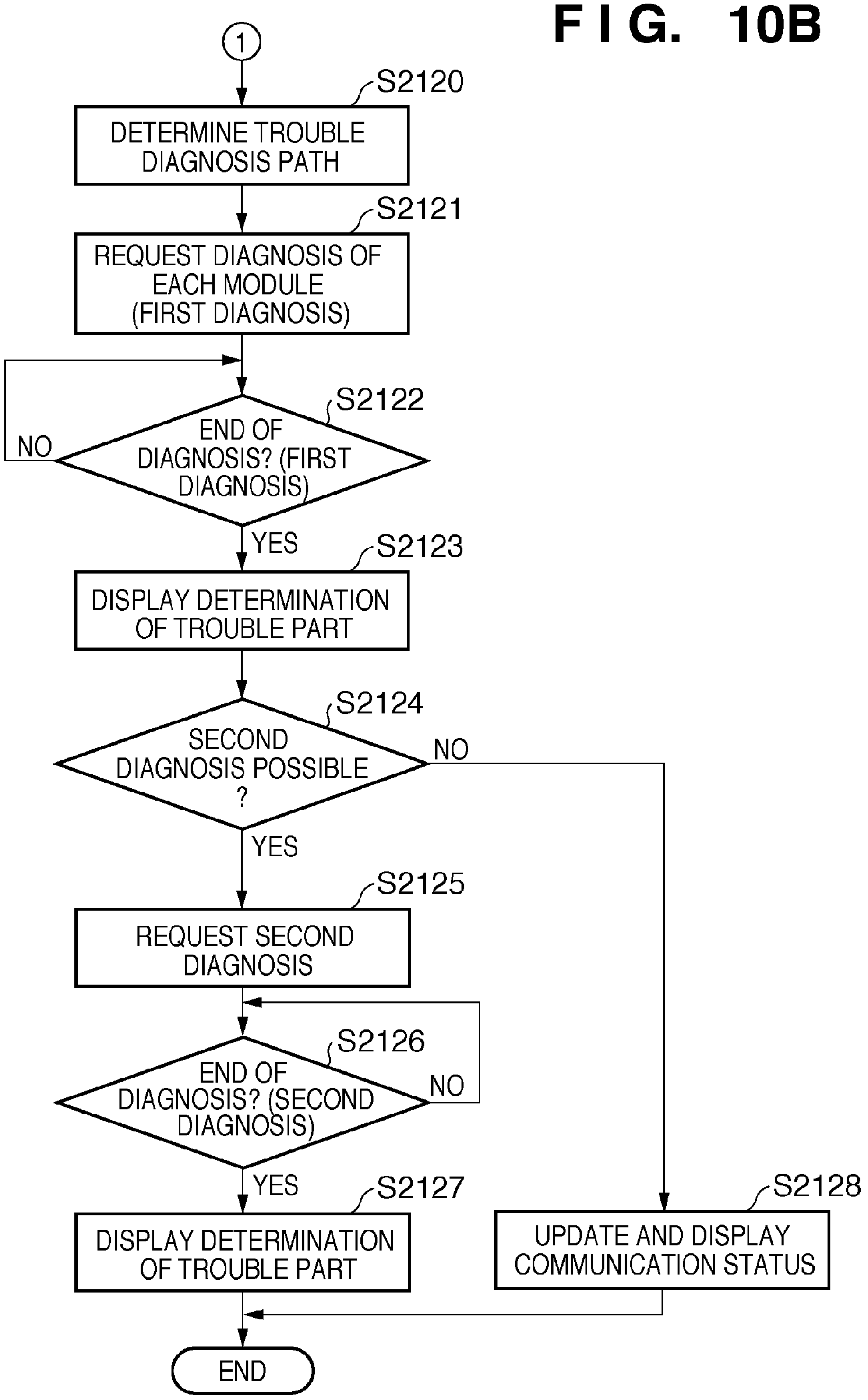

The detailed diagnosis process in step S2042 of FIGS. 9A and 9B will be described with reference to FIGS. 10A and 10B. FIGS. 10A and 10B are flowcharts showing the sequence of the detailed diagnosis process according to the first embodiment. In the detailed diagnosis, a board or communication line which goes wrong is specified. When an error occurs in the system, the detailed diagnosis process is done in accordance with an instruction from the master CPU 1001. The detailed diagnosis process includes the first and second diagnosis processes. A communication path is checked in the first diagnosis process, and a trouble part is specified in the second diagnosis process.

After the start of the detailed diagnosis process, in step S2100, the master CPU 1001 makes a self-diagnosis by checking corruption of its program data, checking the operation of the work RAM, and checking connection with the network communication bus 1002. Further, the master CPU 1001 determines whether the diagnosis result is normal. If the diagnosis result is normal, the process advances to step S2101; if NO, to step S2160. In step S2160, the master CPU 1001 notifies the controller 460 of an error, instructs it to perform an error process, and forcibly stops supply of power and issuing of commands.

If the diagnosis result is normal, the master CPU 1001 checks communication through the network communication bus 1002 in step S2101. In step S2102, the master CPU 1001 determines whether it can normally communicate with all nodes on an upper-layer network, i.e., whether it can normally communicate with all sub-master CPUs. If communication with all sub-master CPUs is normal, the process advances to step S2103. If communication with at least one sub-master CPU is abnormal, the process advances to step S2120.

In step S2103, the master CPU 1001 functions as a determination unit and determines a diagnosis path. More specifically, the master CPU 1001 determines which of connection lines connecting CPUs including the master CPU, sub-master CPUs, and slave CPUs is used to perform the detailed diagnosis process. In this case, the master CPU 1001 determines a diagnosis path via the sub-master CPUs. After determining the diagnosis path, the master CPU 1001 functions as a performing unit and instructs all sub-master CPUs to perform the first diagnosis process for each sub-module in step S2104. In the first diagnosis process, it is checked whether communication with sub-module building elements is possible, and the sub-master CPUs and slave CPUs make a self-diagnosis. In step S2105, the master CPU 1001 determines whether the first diagnosis process has ended. If the sub-master CPUs and slave CPUs have ended the first diagnosis process by themselves, they notify the master CPU 1001 of the diagnosis results. Hence, the master CPU 1001 determines whether it has received first diagnosis process end notifications from all CPUs. If all CPUs have ended the first diagnosis process, the process advances to step S2106. In step S2106, the master CPU 1001 displays the results of the first diagnosis process on the display unit of the operation unit 10.

After the end of the first diagnosis process, in step S2107, the master CPU 1001 instructs the sub-master CPUs to perform the second diagnosis process in order to specify a detailed trouble part. Similar to the first diagnosis process, if the master CPU 1001 determines in step S2108 that it has received the results of the second diagnosis process from the sub-master CPUs, the process advances to step S2109. The master CPU 1001 displays the results of the second diagnosis process on the display unit of the operation unit 10, ending the detailed diagnosis process.

If the master CPU 1001 determines in step S2102 that that communication with at least one sub-master CPU is abnormal, the master CPU 1001 determines diagnosis paths using the connection lines 612*b*, 612*a*, 711*a*, 808*a*, and 909*b* shown in FIG. 4 in step S2120. After determining the diagnosis paths, the master CPU 1001 instructs sub-modules to perform the first diagnosis process via a plurality of determined diagnosis paths in step S2121. In step S2122, the master CPU 1001 determines whether the first diagnosis process has ended for all sub-modules. If YES in set S2122, the process advances to step S2123. In step S2123, the master CPU 1001 displays the diagnosis results received from the sub-modules on the display unit of the operation unit 10.

In step S2124, the master CPU 1001 determines, based on information representing whether communication with each sub-master CPU is possible, whether each sub-master CPU can perform the second diagnosis process. If the master CPU 1001 determines that there is a sub-master CPU capable of performing the second diagnosis process, the process advances to step S2125. The master CPU 1001 instructs the sub-master CPU capable of performing the second diagnosis process to perform it. In step S2126, the master CPU 1001 determines whether all sub-master CPUs have ended the second diagnosis process. If YES in step S2126, the process advances to step S2127. The master CPU 1001 displays the diagnosis results on the display unit of the operation unit 10, ending the detailed diagnosis process.

In step S2128, the master CPU 1001 displays the communication check status on the display unit of the operation unit 10 without performing the second diagnosis process for a sub-master CPU determined in step S2124 not to be able to perform the second diagnosis process. Then, the detailed diagnosis process ends.

A command flow in the diagnosis process between CPUs in accordance with a trouble situation will be explained with reference to FIGS. 11A to 13. Although all sub-modules undergo the diagnosis process, a diagnosis process for only one module will be described for convenience.

Figure 11A:
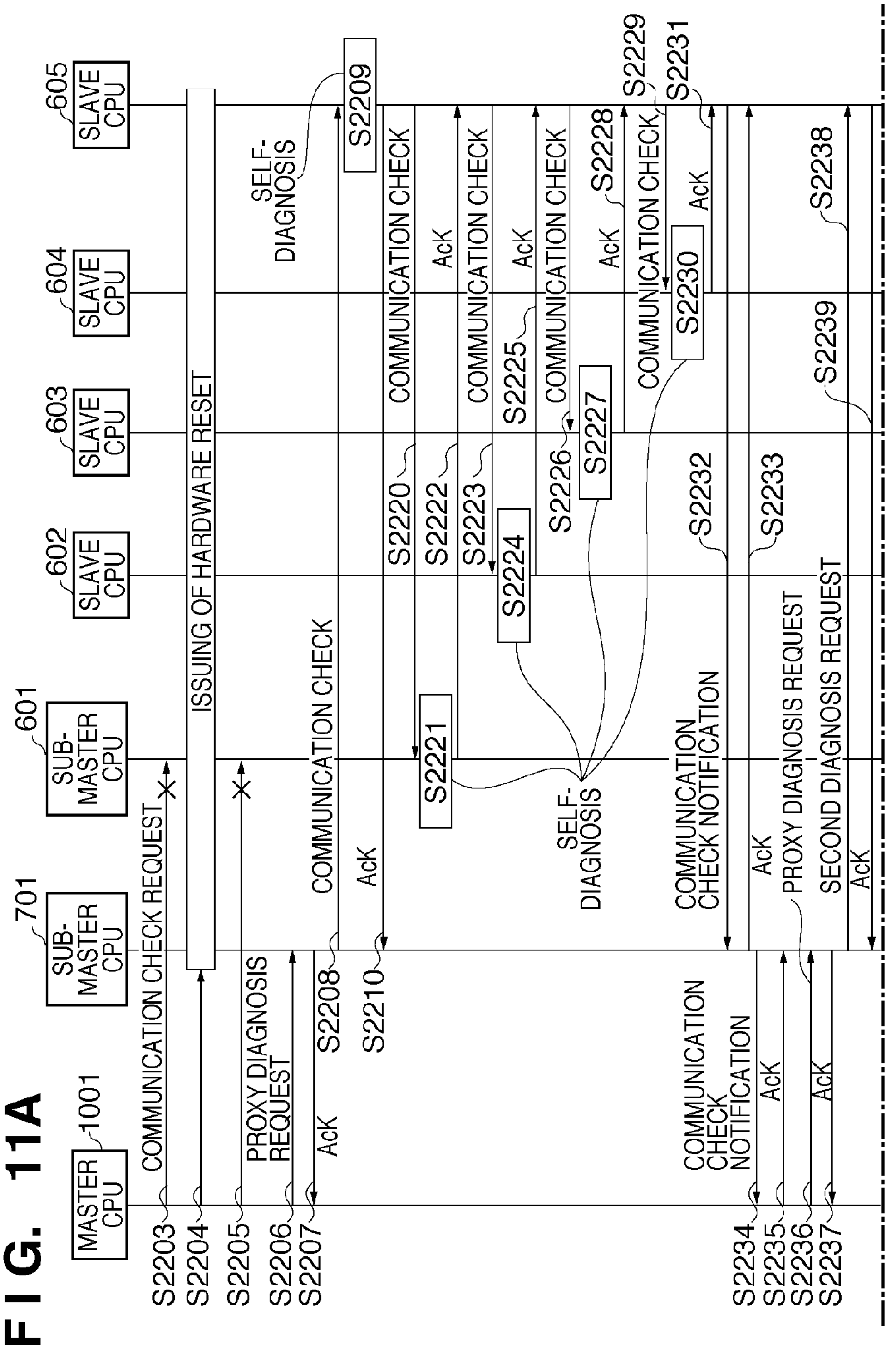
FIGS. 11A and 11B are charts showing a command flow when diagnosing a convey module A 280 according to the first embodiment.
Figure 11B:
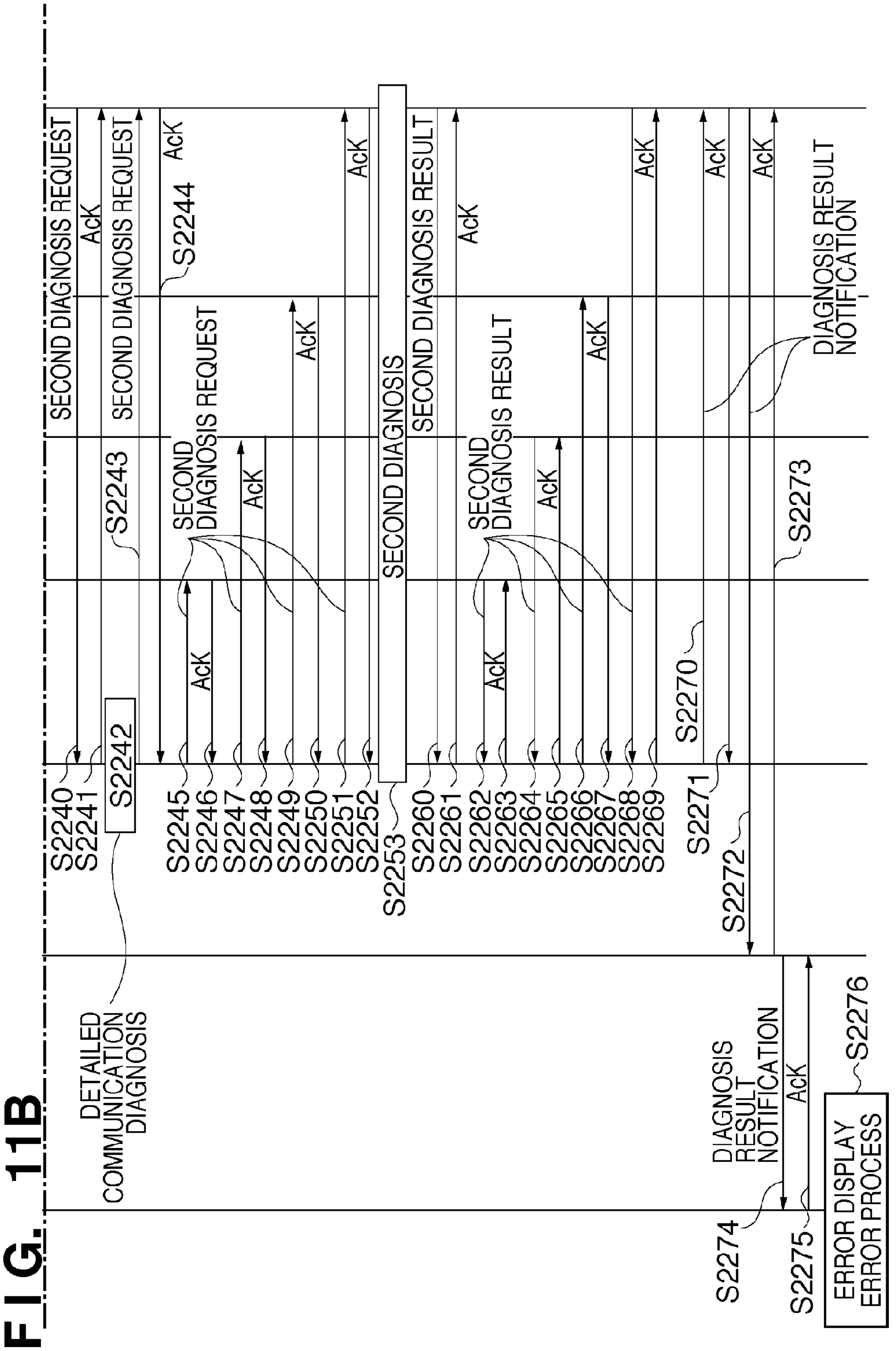

FIGS. 11A and 11B are charts showing a command flow when diagnosing the convey module A 280 according to the first embodiment. The command flow in FIGS. 11A and 11B assume that only communication with the sub-master CPU 601 through the network communication bus 1002 has been disconnected. Note that an acknowledgement (Ack) to each command is described in FIGS. 11A and 11B, but will not be mentioned for descriptive convenience. In FIGS. 11A and 11B, the absence of a description of an Ack to a command means that the command notification has failed. More specifically, no normal response is replied for command notifications in steps S2203 and S2205, so these command notifications fail.

In step S2203, the master CPU 1001 issues a communication check request to the sub-master CPU 601 which comprehensively controls the convey module A 280. At this time, the sub-master CPU 601 does not send back a response to the request. Thus, in step S2204, the master CPU 1001 issues a hardware reset to all sub-modules using reset signal lines. In step S2205, the master CPU 1001 issues again a communication check request to the sub-master CPU 601. Also at this time, the sub-master CPU 601 does not send back a response. In step S2206, therefore, the master CPU 1001 switches the diagnosis path to the sub-master CPU 701, and issues a request to the sub-master CPU 701 to check communication with the convey module A 280.

Upon receiving the communication check request, the sub-master CPU 701 transmits a communication check request to the slave CPU 605 via the connection line 612*a* in step S2208. Upon receiving the communication check request, the slave CPU 605 makes a self-diagnosis in step S2209 by checking corruption of its program data, checking the operation of the work RAM, and checking connection with the serial bus 612. In step S2220, the slave CPU 605 tires to communicate with the sub-master CPU 601 via the serial bus 612. Upon receiving the command, the sub-master CPU 601 makes a self-diagnosis in step S2221, and sends back an Ack together with the self-diagnosis result to the slave CPU 605 in step S2222.

In the same way, the slave CPU 605 checks communication with the slave CPUs 602 to 604 connected to the serial bus 612 in steps S2223 to S2231. Each slave CPU makes a self-diagnosis and sends back an Ack together with the self-diagnosis result. After the end of checking communication with all the devices of the convey module A 280, the slave CPU 605 notifies the sub-master CPU 701 of the check results in step S2232. In step S2234, the sub-master CPU 701 notifies the master CPU 1001 of the received check result.

After the end of the communication check, in step S2236, the master CPU 1001 determines an item to be diagnosed, based on the communication check result, and requests the second diagnosis process of the sub-master CPU 701 via the path used for the communication check. In step S2238, the sub-master CPU 701 requests the slave CPU 605 to perform the second diagnosis process. In step S2240, the slave CPU 605 requests the sub-master CPU 601 to perform the second diagnosis process.

In step S2242, the sub-master CPU 601 checks the transmission/reception level via the path used for the communication check to determine the reason of the communication error with the master CPU 1001. Then, the sub-master CPU 601 checks the connection state between the master CPU 1001 and the network communication bus 1002. In steps S2243 to S2252, the sub-master CPU 601 requests the slave CPUs 602 to 605 to perform the second diagnosis process, and instructs the slave CPUs to check the mutual operations in collaboration with each other. In step S2253, the convey module A 280 makes a diagnosis as a whole. In steps S2260 to S2268, the respective slave CPUs transmit the diagnosis results to the sub-master CPU 601.

Upon receiving the diagnosis results, in step S2270, the sub-master CPU 601 transmits them to the slave CPU 605. In step S2272, the slave CPU 605 transmits the diagnosis results to the sub-master CPU 701. In step S2274, the sub-master CPU 701 transmits the diagnosis results to the master CPU 1001. In step S2276, the master CPU 1001 displays the diagnosis results on the display unit of the operation unit 10 and performs a process of canceling the error state and an error process of, for example, partially turning off the power supply.

<Modification>

Figure 12A:
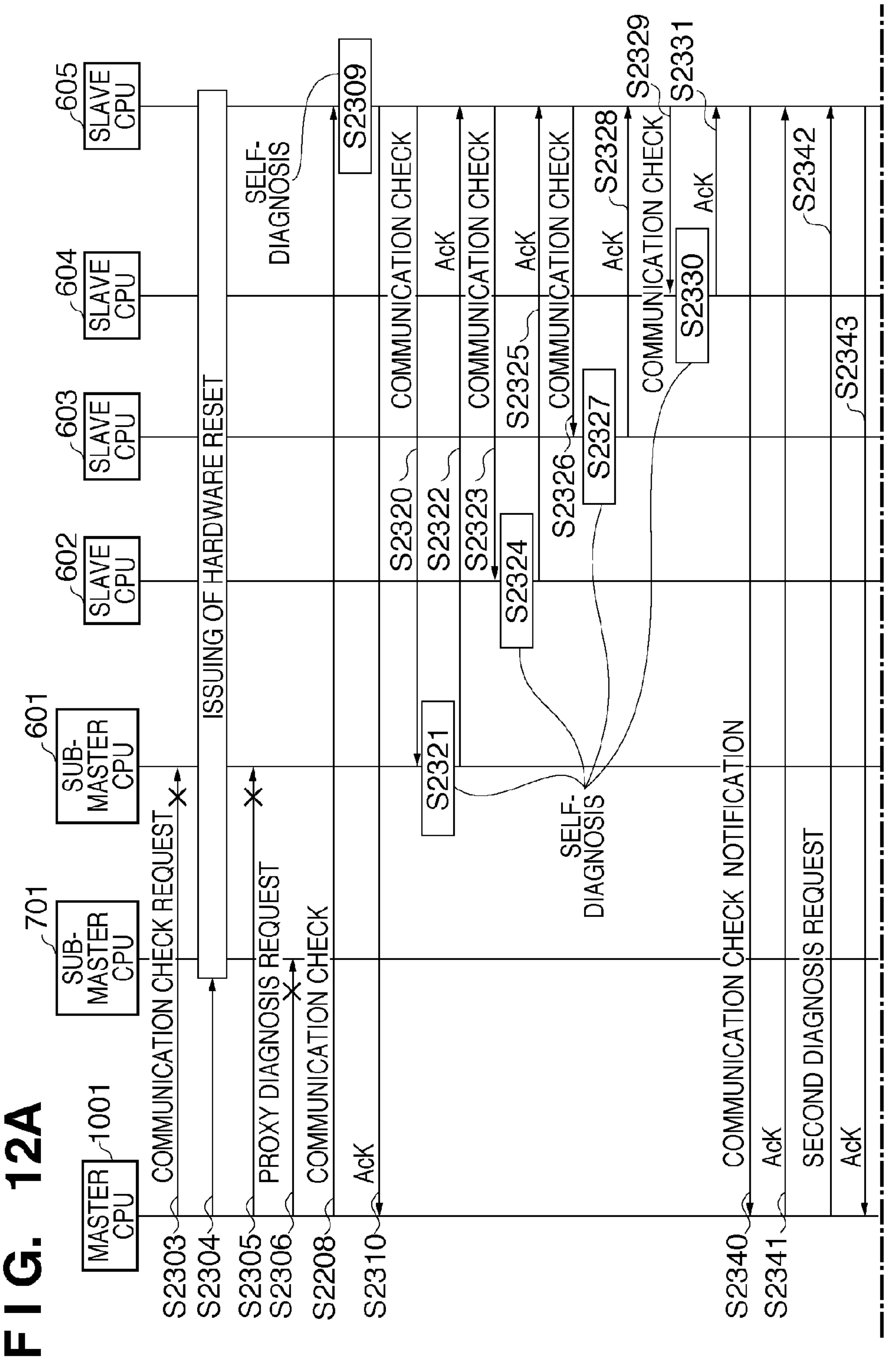
FIGS. 12A and 12B are charts showing a command flow when diagnosing the convey module A 280 according to the first embodiment.
Figure 12B:
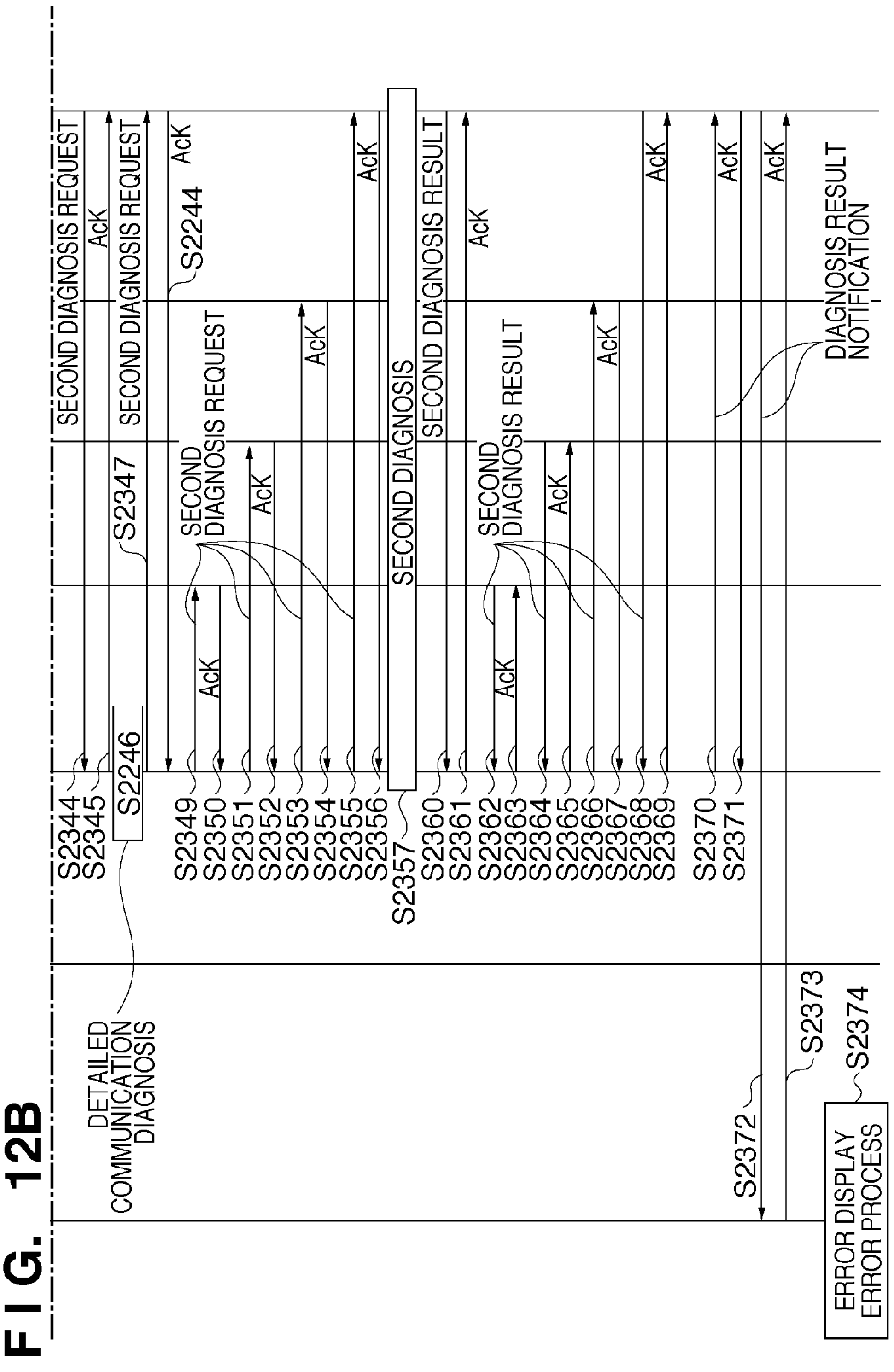

A modification to the command flow of FIGS. 11A and 11B will be explained with reference to FIGS. 12A and 12B. FIGS. 12A and 12B are charts showing a command flow when diagnosing the convey module A 280 according to the first embodiment. The command flow in FIGS. 12A and 12B assume that communication through the network communication bus 1002 has completely broken. Note that an acknowledgement (Ack) to each command is described in FIGS. 12A and 12B, but will not be mentioned for descriptive convenience. In FIGS. 12A and 12B, the absence of a description of an Ack to a command means that the command notification has failed. More specifically, no normal response is replied for command notifications in steps S2303, S2305, and S2306, so these command notifications fail.

In step S2303, the master CPU 1001 issues a communication check request to the sub-master CPU 601 which comprehensively controls the convey module A 280. At this time, the sub-master CPU 601 does not send back a response to the request. Thus, in step S2304, the master CPU 1001 issues a hardware reset to all sub-modules using reset signal lines. In step S2305, the master CPU 1001 issues again a communication check request to the sub-master CPU 601. Also at this time, the sub-master CPU 601 does not send back a response. In step S2306, therefore, the master CPU 1001 switches the diagnosis path to the sub-master CPU 701, and issues a request to the sub-master CPU 701 to check communication with the convey module A 280. Since the sub-master CPU 701 does not send back a response, the master CPU 1001 issues a request to the slave CPU 605 via the connection line 612*b* in step S2308 to check communication with the convey module A 280.

Upon receiving the communication check request, the slave CPU 605 makes a self-diagnosis in step S2309 by checking corruption of its program data, checking the operation of the work RAM, and checking connection with the serial bus 612. In step S2320, the slave CPU 605 tires to communicate with the sub-master CPU 601 via the serial bus 612. Upon receiving the command, the sub-master CPU 601 makes a self-diagnosis in step S2321, and sends back an Ack together with the self-diagnosis result to the slave CPU 605 in step S2322.

In the same way, the slave CPU 605 checks communication with the slave CPUs 602 to 604 connected to the serial bus 612 in steps S2323 to S2331. Each slave CPU makes a self-diagnosis and sends back an Ack together with the self-diagnosis result. After the end of checking communication with all the devices of the convey module A 280, the slave CPU 605 notifies the master CPU 1001 of the check results in step S2340.

After the end of the communication check, in step S2342, the master CPU 1001 determines an item to be diagnosed, based on the communication check result, and requests the second diagnosis process of the slave CPU 605 via the path used for the communication check. In step S2344, the slave CPU 605 requests the sub-master CPU 601 to perform the second diagnosis process.

In step S2346, the sub-master CPU 601 checks the transmission/reception level via the path used for the communication check to determine the reason of the communication error with the master CPU 1001. Then, the sub-master CPU 601 checks the connection state between the master CPU 1001 and the network communication bus 1002. In steps S2347 to S2356, the sub-master CPU 601 requests the slave CPUs 602 to 605 to perform the second diagnosis process, and instructs the slave CPUs to check the mutual operations in collaboration with each other. In step S2357, the convey module A 280 makes a diagnosis as a whole. In steps S2360 to S2369, the respective slave CPUs transmit the diagnosis results to the sub-master CPU 601.

In step S2370, the sub-master CPU 601 transmits the received diagnosis results to the slave CPU 605. In step S2372, the slave CPU 605 transmits the received diagnosis results to the master CPU 1001. In step S2374, the master CPU 1001 displays the received diagnosis results on the display unit of the operation unit 10 and performs a process of canceling the error state and an error process of, for example, partially turning off the power supply.

Figure 13:
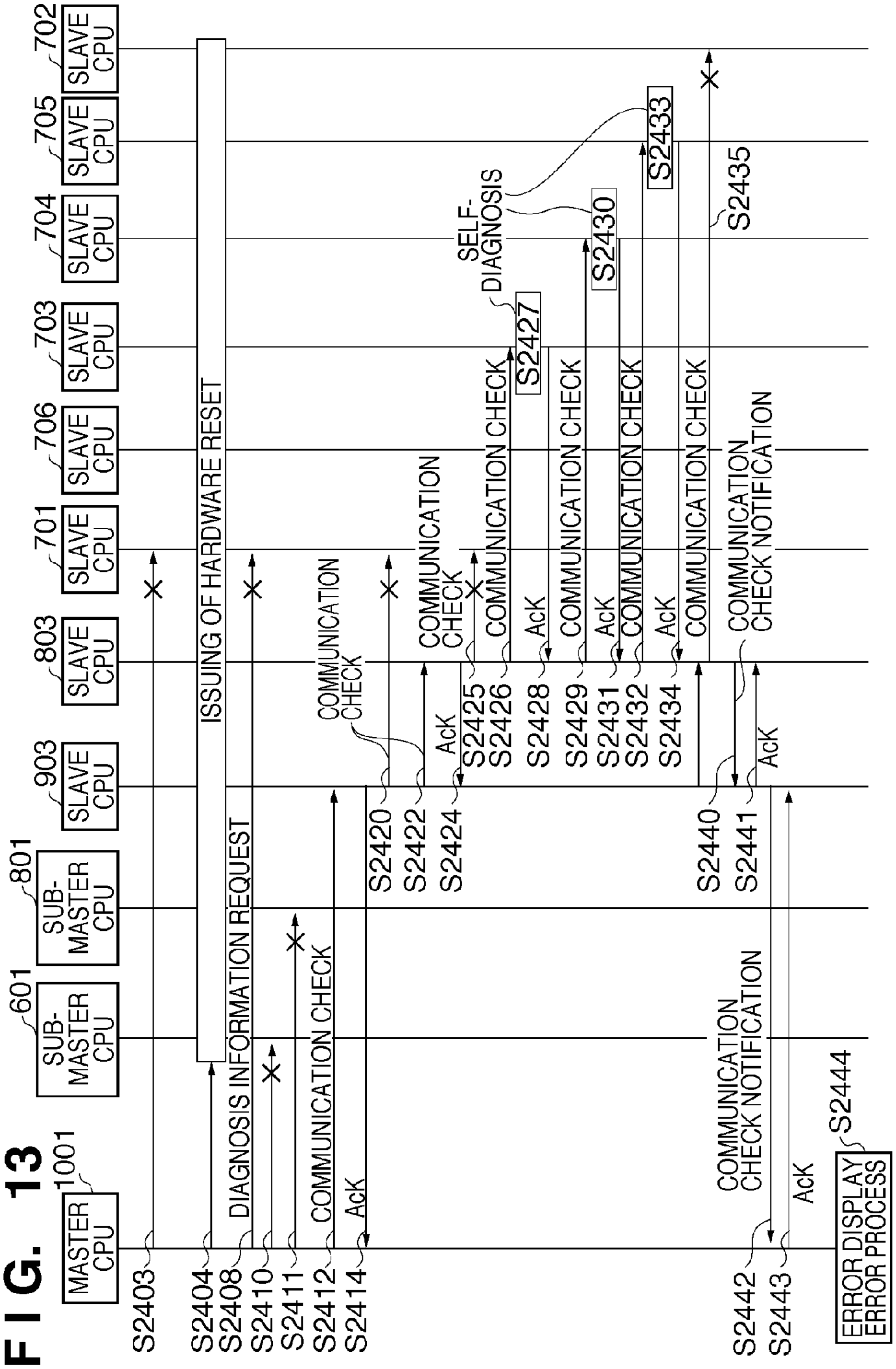
FIG. 13 is a chart showing a command flow when diagnosing an image forming module 282 according to the first embodiment.

A detailed diagnosis process in the image forming module will be described with reference to FIG. 13. FIG. 13 is a chart showing a command flow when diagnosing the image forming module 282 according to the first embodiment. The command flow in FIG. 13 assumes that communication errors have occurred in the network communication bus 1002 and image forming module 282. Note that the basic flow in FIG. 13 is the same as those in FIGS. 11 and 12 and will be described briefly. An acknowledgement (Ack) to each command is described in FIG. 13, but will not be mentioned for descriptive convenience. In FIG. 13, the absence of a description of an Ack to a command means that the command notification has failed. More specifically, no normal response is replied for command notifications in steps S2403, S2408, S2410, S2411, S2420, S2425, and S2435, so these command notifications fail.

In step S2403, the master CPU 1001 issues a communication check request to the sub-master CPU 701 which comprehensively controls the image forming module 282. Since the sub-master CPU 701 does not send back a response, the master CPU 1001 issues a hardware reset in step S2404 and issues again a communication check request to the sub-master CPU 701 in step S2408. Also at this time, the sub-master CPU 701 does not send back a response, so the master CPU 1001 sequentially switches the path for the communication check and checks communication.

In steps S2410 to S2414, the master CPU 1001 checks communication with each CPU and specifies a CPU capable of normal communication. Assume that the master CPU 1001 can normally communicate with the slave CPU 903. Then, in steps S2420 to S2440, the slave CPU 903 checks communication with other CPUs, and notifies the master CPU 1001 of the communication results in step S2442. In step S2444, the master CPU 1001 displays the communication check results on the display unit of the operation unit 10 and performs a process of canceling the error state and an error process of, for example, partially turning off the power supply, without performing the second diagnosis process because it cannot communicate with the sub-master CPU 701.

As described above, according to the embodiment, the connection lines 612*b*, 612*a*, 711*a*, 808*a*, and 909*b* are arranged for diagnosis, which are not used in a normal operation. According to the embodiment, even if an error occurs in communication during a normal operation, a communication path for performing a diagnosis process can be ensured using these connection lines. When two communication lines are simply arranged, they can provide a guarantee against a trouble of a communication line. However, in a form having a hierarchical structure as described in the present invention, the use of a plurality of communication paths can cope with errors in various situations, increasing the diagnosis accuracy upon generation of a trouble. The image forming apparatus according to the embodiment can easily recover from a device trouble by a minimum repair.

OTHER EMBODIMENTS

Other embodiments will be described. In the first embodiment, the serial buses 612, 711, 808, and 909 employ an interface form which permits a plurality of bus masters. The slave CPU 706 runs as a master on the serial bus 612. Similarly, the slave CPU 803, slave CPU 903, and master CPU 1001 run as masters on the serial bus 711, the serial bus 909, and the serial buses 612 and 909, respectively.

However, the present invention assumes even a bus complying with a serial bus form which permits only a single master. It is also possible to operate the CPU as a slave in a normal operation and as a master only when the master of each serial bus fails in normal communication using the serial bus.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-100371 filed on Apr. 16, 2009, which is hereby incorporated by reference herein in its entirety.

What is claimed is:

1. An image forming apparatus comprising:

a master control unit that controls a plurality of sub-master control units via a first communication line for forming an image on a printing material;

said plurality of sub-master control units that respectively control any of a plurality of slave control units via a second communication line for implementing a function regarding an image formation, wherein each sub-master control unit controls different slave control units;

said plurality of slave control units that controls a load for implementing the function;

a third communication line that connects said master control unit with one of said sub-master control units; and a fourth communication line that connects one of said slave control units controlled by said one sub-master control unit with another slave control unit controlled by another sub-master control unit, wherein a connection bridge is formed by use of the second and third communication lines, and wherein in a case that an error occurs in the image forming apparatus, said master control unit determines a path, using at least one of the communication lines from among the first, second, third and fourth communication lines, for performing a communication of a diagnosis process based on a diagnosis result of a network, and performs the communication related to the diagnosis process via the determined path.

2. The apparatus according to claim 1, wherein said one slave control unit monitors whether an operation of another slave control unit is active and detects an error when said slave control unit is inactive, and the diagnosis process for the detected error is performed in response to detection of the error.

3. The apparatus according to claim 1, wherein the diagnosis process specifies a part and content of the error.

4. The apparatus according to claim 1, wherein said master control unit notifies a user of a result of the diagnosis process.

5. The apparatus according to claim 1, wherein the second communication line is higher in data transfer timing accuracy than the first communication line.

6. An image forming apparatus comprising:

a master control unit that controls the image forming apparatus for forming an image on a printing material;

a first sub-master control unit that is controlled by said master control unit via a first signal line and controls a first function for performing image formation;

a first slave control unit that is controlled by said first sub-master control unit via a second signal line and controls a load for implementing the first function;

a second sub-master control unit that is controlled by said master control unit via the first signal line and controls a second function for performing image formation;

a second slave control unit that is controlled by said second sub-master control unit via a third signal line and controls a load for implementing the second function; and a connection bridge that is connected between said first slave control unit and said second slave control unit, wherein said master control unit performs a diagnosis process for an error of the image forming apparatus using at least one of the first signal line, the second signal line, the third signal line, and the connection bridge.

* * * * *